United States Patent [19]

Leavitt et al.

[11] Patent Number: 4,808,391

[45] Date of Patent: Feb. 28, 1989

[54] OXIDATION-REDUCTION PROCESS FOR ENHANCING THE COLOR OF AND STABILIZING WET PROCESS PHOSPHORIC ACID

[75] Inventors: David D. Leavitt, Lawrence, Kans.; Ken E. Kranz, Kansas City, Mo.; Greg A. Gorman, Bonner Springs, Kans.; Norman L. Stewart, Jr., Lake Alfred, Fla.

[73] Assignee: Farmland Industries, Inc., Kansas City, Mo.

[21] Appl. No.: 46,030

[22] Filed: May 1, 1987

[51] Int. Cl.⁴ .............................................. C01B 15/16
[52] U.S. Cl. .................................. 423/321 R; 423/316
[58] Field of Search ....................... 423/321 R, 320, 316

[56] References Cited

U.S. PATENT DOCUMENTS

| | | | |
|---|---|---|---|
| 2,968,528 | 1/1961 | Tuttle et al. | 423/321 R |
| 4,420,321 | 12/1983 | Wilson | 423/321 R |
| 4,637,922 | 1/1987 | Nakatani et al. | 423/321 R |

FOREIGN PATENT DOCUMENTS 1020015 2/1966 United Kingdom ............ 423/321 R

*Primary Examiner*—Gregory A. Heller

*Attorney, Agent, or Firm*—Hovey, Williams, Timmons & Collins

[57] ABSTRACT

A two-stage oxidation/reduction process for preparing commercially valuable, color enhanced and stabilized low viscosity wet process phosphoric acid is provided which yields improved acid that can be concentrated to superphosphoric acid and/or converted to high quality liquid fertilizer by reaction with ammonia, all without reversion to black color or excessive sludge formation in the fertilizer. The preferred process involves initially oxidizing a starting black acid having a 58–72% $P_2O_5$ concentration by addition of an oxidizing agent such as $NH_4NO_3$ with heating and agitation until the oxidized acid exhibits an EMF of greater than about 700 mv as compared with a 600 mv standard; the oxidized acid is then subjected to a reduction step to lower the valence of metallic impurities, by aging and/or adding reducing agents such as ferrous iron compounds to the acid. The reduction is carried out until the EMF of the product is less than 700 mv relative to the standard and a stabilized green color is produced in the acid. The final acid product may be concentrated if in the form of orthophosphoric acid, or cooled and directly reacted with ammonia if the product is SPA.

22 Claims, 15 Drawing Sheets

TREATMENT PROCESS

SCHEMATIC OF EXPERIMENTAL APPARATUS

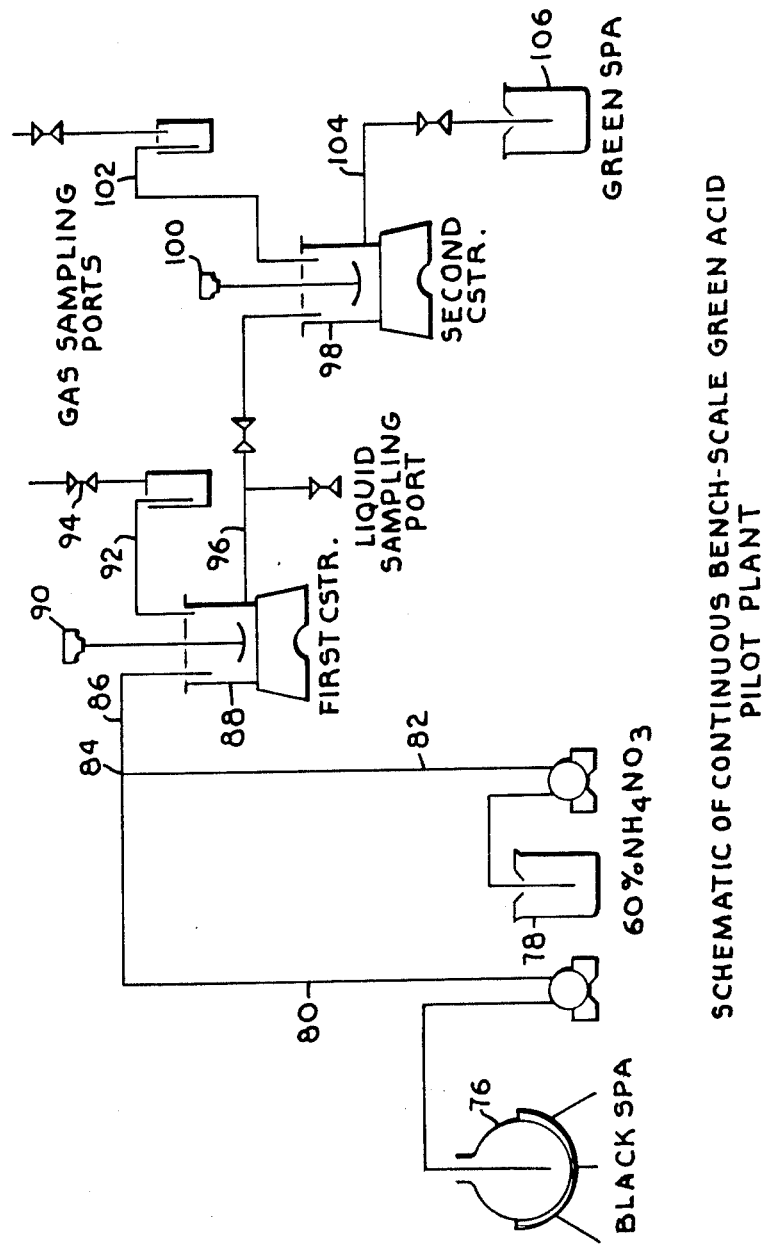

Example 1: Batch Processing of SPA
TIME VS. WT.%NH4O3, EMF, WT% C, VISCOSITY

□ EMF (mv)   + Wt.% C   ◇ VIS.(cD)   △ Wt.% AN

Example 1: Batch Processing of SPA
TIME VS. BY PRODUCT GAS ANALYSIS

□ NO2   + N2O   ◇ O2   △ CO2   × N2   ▽ CO

Example 2: Batch Processing of WPA
PLOT OF TIME VS. EMF, Wt.%C, Wt.% AN

□ EMF(mv)   + Wt.% C   ◇ Wt.% AN

Example 2: Batch Processing of WPA
TIME VS. BY-PRODUCT GAS ANALYSIS

□ N2   + N2O   ◇ NO   △ NO2   × CO   ▽ CO2

Example 2: Batch Processing WPA
VISIBLE WAVELENGTH TRANSMITTANCE

REDUCTION of PURPLE SPA
WITH POWDERED IRON AND BLACK SPA

Stability of 10-34-0 Liquid Fertilizer

OXIDATION-REDUCTION PROCESS FOR ENHANCING THE COLOR OF AND STABILIZING WET PROCESS PHOSPHORIC ACID

BACKGROUND OF THE INVENTION

1. Field of the Invention

This invention relates to the field of liquid fertilizers prepared from wet-process phosphoric acid, and especially to an improved process for stabilizing and enhancing the color of wet-process phosphoric acid to produce a marketable product having color, clarity, and stability characteristics acceptable to the consumer both before and after conversion into liquid fertilizer. More particularly, it is concerned with such a process which involves controlled, sequential oxidation and reduction steps which unexpectedly produce a very desirable, green-colored stabilized acid from less desirable black acid.

2. Description of the Prior Art

For economic reasons, phosphoric acid used in the production of fertilizers, including liquids, has generally been obtained from phosphate rock by the wet process. This process includes the steps of acidulating the rock with sulfuric acid to precipitate calcium sulfate, solids removal by filtration, and concentration of the weak acid to a desired level by any one of a number of conventional evaporative techniques. The weak filter-grade acid is concentrated to different commercial grades or acid strengths ranging from 42% to 72% acid ($P_2O_5$ basis) during such evaporation processes. The acid liquor is exposed to increasing temperatures during concentration, attaining a temperature between 370° and 420° F. at less than atmospheric pressures for the production of 68%–72% $P_2O_5$ equivalent acid or superphosphoric acid (SPA). SPA contains the $P_2O_5$ equivalent of approximately 100% $H_3PO_4$ as well as varying amounts of polyphosphate. SPA is the preferred commercial acid for the manufacture of ammonium phosphate liquid fertilizer, and is typically reacted with anhydrous ammonia using a pipe reactor to form common liquid fertilizer grades. The acid liquor is exposed to high temperatures usually ranging from 450° to 750° F. generated by the heat of the reaction during conversion into liquid fertilizer. The high temperatures of concentration and conversion have the beneficial effect of promoting the formation of polyphosphates from orthophosphate, which tend to stabilize by sequestration of certain metallic impurities present in the acid. Unfortunately, other impurities including organic materials are destabilized or undesirably altered under the same conditions.

Although filtration removes most of the calcium sulfate solids during acidulation, the weak acid still contains a wide variety of chemical impurities originating from the rock that are solubilized and dispersed within the acid liquor. The principal metallic impurities consist of iron, aluminum, and magnesium oxides, salts, sulfates, and complexes; and the trace metallic impurities consist of similar compounds containing manganese, vanadium, chromium, zinc, cadmium, cobalt, and uranium. Acid-soluble and acid-insoluble organic impurities composed of colloidal carbon, humic acids and aldehydes, alkanes, keratins, and bitumins are also present in the acids. Other impurities include residual sodium, potassium, and calcium salts, sulfates, and silicates, including fluoride and chloride salts and complexes.

The insoluble and soluble organic material present in the weak phosphoric acid produced by acidulation form a matrix that enhances and stabilizes the foam of the acid liquor during concentration. Foaming occurs when gaseous water and residual carbon dioxide percolate through the acid during evaporation and are entrapped by the organic impurities in the acid liquor. The stabilized foam reduces the rate of evaporation and flow rate through the evaporators, and some entrained foam passes out of the evaporators with the vapor phase. Losses of $P_2O_5$ contained within the entrained foam are equivalent to 1 to 5 weight percent of the 68% SPA product. A variety of carbon-base antifoam products are added to the weak acid during concentration to destabilize the foam and retard its formation. The organic impurities, through foaming, contribute significantly to the costs associated with the production of superphosphoric acid by increasing the loss of $P_2O_5$ and necessitating the addition of antifoam products.

The organic impurities, including any residual antifoam product, char or form an opaque carbon floc when exposed to the high temperature, reducing environment present during concentration of the acid. The carbon floc forms a viscous matrix that increases the viscosity of the acid and hinders the removal of other undesirable metallic impurities. Such metallic impurities are typically removed from superphosphoric acid by filtration and the carbon floc binds the filter cloth and filter media, resulting in unacceptable and uneconomical pressure drop across the filter and excessively long filtration times.

The carbon floc carries over during conversion of the concentrated acid into liquid fertilizer and imparts an objectionable black or dark color to the product. Furthermore, the carbon floc reduces the clarity of the liquid fertilizer and obscures the presence of metal phosphate precipitates that may clog spray nozzles or settle out into insoluble sludge during storage. As little as 0.2 weight percent of carbonaceous material in the acid is sufficient to discolor or darken the final liquid fertilizer and greatly reduce its marketability.

The reducing conditions present during acidulation and concentration also tend to promote the formation of lower-oxidation-state metallic complexes such as ferrous phosphate or manganese II phosphate, rather than ferric phosphate or manganese III phosphate. Concentrated wet-process phosphoric acid typically contains a higher percentage of lower-oxidation-state transition metals compared to higher-oxidation-state transition metals. Many of the lower-oxidation-state transition metals, including $Fe^{+2}$, form destabilizing phosphate complexes that promote sludge formation in liquid fertilizer during storage. Metallic impurities containing divalent cations such as ferrous iron and magnesium are difficult to sequester and are more favorably sequestered by tripolyphosphate rather than pyrophosphate. SPA typically contains more pyrophosphate than tripolyphosphate. Thus ferric impurities are more effectively sequestered in SPA and stay in solution longer, as compared to impurities containing divalent cations. A number of insoluble magnesium ammonium phosphate compounds may form during storage in a 10-34-0 solution fertilizer produced from phosphoric acid contaminated with metallic impurities and fluorine impurities. The most common precipitates are compounds similar to $MgAl(NH_4)_5F_2(P_2O_7)_2.6H_2O$. As much as 20–25 weight percent sludge may form in ammonium and potassium polyphosphate liquid fertilizers contaminated by as little as 0.4% ferrous iron. These insoluble precipitates can clog spray nozzle orifices as well as pumps and transfer lines and build up in storage tanks and tank cars. Ferric phosphates, however, do not as readily form insoluble sludges.

Transition metals such as iron, manganese, and vanadium also form intensely colored phosphate complexes, whose color is often dependent upon the oxidation state of the metallic species. Colored metallic complexes that darken or blacken the concentrated phosphoric acid either before or after conversion into liquid fertilizer greatly reduce the marketability of the acid, and have a deleterious effect similar to carbon floc upon the salability of superphosphoric acid.

Historically, black-colored, opaque superphosphoric acid has been an extremely difficult product to sell for the manufacture of liquid fertilizer. Historical data indicate that liquid fertilizer manufactured from black superphosphoric acid tends to clog spray nozzles and settle out into insoluble sludge when stored for lengthy periods of time. Research has indicated that the sludge that forms in liquid fertilizer manufactured from black acid is directly related to magnesium, aluminum, and iron impurities present in the acid. Moreover, it is believed that sludge formation may be catalyzed by trace amounts of lower oxidation-state transition metal complexes containing such metals as manganese, vanadium, nickel, and zinc. These minor complexes may promote the formation of metal phosphate sludge from iron, magnesium, and aluminum impurities that are present in significantly higher concentrations in the acid as compared with the minor complexes. Thus, the destabilizing properties of the black acid are primarily caused by the major and minor lower oxidation-state metallic impurities and are not wholly related to the black color or carbon content of the acid. Removal of most of these metallic contaminants or neutralizing their destabilizing properties by raising their oxidation state would therefore produce a serviceable product with good stability and solubility characteristics, even though the acid remains blackcolored.

However, the organic carbonaceous material obscures the presence in the acid of excessive amounts of finely divided solid metallic impurities. The impurities obscured by the black color of the acid may further contribute to a buildup of scale within the pipe reactors used to convert the SPA and ammonia into black-colored 10-34-0 liquid fertilizer. High levels of magnesium and aluminum carried over from the acid can react to form large amounts of additional insoluble sludge in 10-34-0 typically stored at warm temperatures during the summer season. Thus, most consumers associate the black color with an unstable and inferior product, and prefer to purchase a green-colored clarified phosphoric acid typically produced from calcined phosphate rock. The carbonaceous material present in black acid also impedes the removal of metallic impurities from the acid by filtration and totally interferes with the removal by solvent extraction of certain valuable metallic impurities including uranium. Organic compounds such as humic acids form stable emulsions with the solvents used to extract uranium, and these emulsions build up in continuous countercurrent extractions systems and lower the efficiency of the uranium extraction.

Accordingly, there are a number of very good reasons to decarbonize phosphoric acid from which the metallic impurities have been removed. As a consequence, workers in the art have devoted considerable time and effort to developing economical, commercially viable clarification procedures.

A review of the literature reveals a number of attempts to solve the problem by physical methods. Such include absorption on activated carbon or perlite; flocculation with tall oil pitch, sulfonated polystyrene, polyacrylamide, phendol formaldehyde or fatty acid; simple organic solvent extraction with a hydrocarbon such as kerosene; precipitation with $H_3BO_3$ or borate, or silicate; filtration through colloidal clay, bleaching clay or bentonite and granular carbon; dilution and filtration; and dilution and clarification with rinsate from an aluminum polishing process.

These physical methods successfully decarbonized weak phosphoric acid or SPA diluted to a concentration similar to weak acid. However, the clarified acid produced by the above physical methods turns black again or darkens when concentrated to SPA. Therefore, many investigators have concluded that a successful decarbonization process must remove carbon from SPA rather than from weak 54%, 42%, or filter-grade acid. The above physical processes do not effectively remove carbonaceous material from SPA.

Several chemical processes during strong oxidizing agents may be used to decarbonize SPA. Oxidation of the carbon to $CO_2$ appears to be the most effective process. The following oxidizing reagents are also described in the literature for decarbonization of phosphoric acid: nitric acid and ammonium nitrate; iodate; chromate; permanganate and peroxide; and oxygen and air. Iodate, chromate, permanganate, and peroxide are effective oxidants but appear to increase production costs by more than is acceptable for commercial purposes. Chromate and iodate oxidation would also leave toxic by-products in the acid that could not be easily or inexpensively removed. Oxygen and air oxidation would require significant capital investment for pressurized corrosion-resistant reactors. Ammonium nitrate and nitric acid are less expensive relative to the other oxidants described in the literature.

Defensive Publication No. T892,005 to Scheib, 8920.G.1210, published Nov. 23, 1971, discloses a process wherein black wet-process phosphoric acid and mixtures of wet-process and electric furnace acid are preheated to 250° F. and mixed with around 0.1 to 2 weight percent ammonium nitrate. Scheib teaches that the ammonium nitrate should be added subsequent to heating to preclude loss of oxidizing potential prior to reaching the most effective temperature for oxidation and to minimize undesirable foam production and accumulation. The minimum recommended oxidation temperature is 250° F., and the maximum temperature is around 400° F. Scheib cautioned that further decomposition of dissolved organic material and return of the black color could occur if the clarified acid was raised to a temperature higher than 400° F. during the oxidation process or in subsequent processing.

Typical processing temperatures may not exceed 400° F. during the concentration of weak acid up to SPA in an evaporator. However, SPA is often exposed to much higher temperatures during conversion into 10-34-0. Indeed, the temperature of the SPA may exceed 600° F. during the reaction with anhydrous ammonia in a pipe reactor and immediately thereafter. Instantaneous temperatures within localized microenvironments of the reacting fluid may be even higher. The Scheib process may not remove enough carbon from the acid to prevent blackening of the product upon conversion into 10-34-0 within the pipe reactor. No provisions are made in the Scheib process to stabilize or remove dark-colored metallic complexes that could darken the acid during subsequent processing.

The process described in Canadian Pat. No. 955,033 to Moore is specifically designed to produce light-colored, decarboned SPA that will not blacken when reacted with aqueous ammonia solution using a continuously stirred tank reactor (CSTR) during production of 10-34-0. Nitric acid, ammonium nitrate, and sodium perchlorate are the preferred reagents for this oxidation process. Typical reaction mixtures contain between 0.75 and 10 equivalents (based upon oxygen) of oxidant per mole of carbon present in the SPA, and the oxidant may be added to the SPA at ambient temperatures.

The oxidation reaction is carried out at reaction temperatures between 250° and 650° F., preferably using a single vented CSTR. Best results were obtained by mixing 40 lb. 67% $HNO_3$ per ton of SPA (68% basis) or 50 lb. $NH_4NO_3$ per ton SPA (68% basis) and reacting the mixture in a CSTR at 440° F. for around 1-5 minutes. Evolved gases consisted of a mixture of water vapor, carbon dioxide, nitrogen oxides, and nitrogen. The resulting oxidized SPA is described by Moore as containing approximately the same polyphosphate content as black acid.

The decolorized SPA was reacted with aqueous ammonia around 140° F. in a CSTR to produce aqueous yellow-or tan-colored 10-34-0 or other similar ammonium phosphate liquid fertilizers, rather than a desirable green-colored product. The single-stage decarbonization reaction described by the Moore process therefore does not provide for enhancement of the color of the decarbonized SPA. Further, no attempt is made in the Moore process to adjust or stabilize the oxidation state of the various colored transition metal complexes present in the acid.

U.S. Pat. No. 4,420,321 to Wilson is significantly different from the processes developed by both Moore and Scheib in that carbon floc is sought to be removed from SPA during conversion of the acid into liquid ammonium phosphate fertilizer using a pipe reactor. An oxidant such as nitric acid is added to SPA and anhydrous ammonia in the pipe reactor where reaction conditions typically generate temperatures ranging from 500° to 700° F. and pressures exceeding 400 psig. Around 5.26 tons $HNO_3$ are postulated to decarbonize the 1 ton of carbonaceous floc typically found in 250.4 tons 70% SPA ($P_2O_5$ basis). Wilson asserts that liquid fertilizer produced by the process should be clear and colorless and the evolved by-product gases should be clear and odorless.

Wilson did not report the results of an actual test of this process in which anhydrous ammonia, SPA, and $HNO_3$ were reacted together in a pipe reactor. The simulated test decarbonized 10-34-0 ammonium polyphosphate liquid fertilizer with $HNO_3$ using a pressurized and heated pipe, attaining a reaction temperature of 590° F. and pressure of 400 psig. Results of the simulated test indicated that decarbonization did not occur until after 49 minutes of continuous processing. The residence time during actual liquid fertilizer pipe reactor conditions is relatively short, on the order of seconds, and it is believed that this may be insufficient time to satisfactorily decarbonize the SPA using the Wilson process. In addition, no provision is made in the process to enhance the color or stability of the SPA or liquid fertilizer.

Furthermore, the Wilson process could not easily be implemented in the field. Clear, green-colored SPA is the favored acid of commerce and is transported from the manufacturer to remote locations for on-site conversion into liquid fertilizer. Black SPA is not generally accepted by those who formulate liquid fertilizer. A formulator would be required to modify existing equipment or purchase additional equipment to successfully utilize the Wilson process. At the very least, $HNO_3$ is a corrosive and hazardous material that is not easily transported, stored, and utilized by those who formulate liquid fertilizer.

Finally, the Wilson process is not versatile. In the process the optimum temperatures for decarbonization are generated by the heat of formation of ammonium phosphate, and the end product is ammonium polyphosphate fertilizer. The Wilson process is specifically designed to produce liquid fertilizer, not SPA. The heat generated during the reaction of ammonia with phosphoric acid is used during the process to accelerate the reactions between oxidant and carbonaceous material present in the mixture, and the product of the proces is ammonium polyphosphate, not phosphoric acid. The process cannot be used to purify, stabilize and decarbonize weak phosphoric acid; i.e., concentrations of phosphoric acid that are less than 68% superphosphoric acids. Thus the Wilson process cannot be used to enhance the production of SPA.

Decarbonization of wet-process acid (WPA) or SPA by oxidation using oxidants containing a nitrate group such as ammonium nitrate or nitric acid has not yet been commercially implemented, primarily because of poor product quality and air pollution problems. It has not been possible for those skilled in the art to produce a desirably colored green acid, and especially, a green-colored WPA that maintains the desirable color without darkening during subsequent processing into more concentrated acid or liquid fertilizer, by the use of a simple, single-stage oxidation process. The concentration of $NO_x$ off-gases produced by previous oxidation processes was sufficiently high to require the use of complicated and expensive pollution control systems. Such problems have precluded the use of existing nitrate oxidation processes for the decarbonization of phosphoric acid.

SUMMARY OF THE INVENTION

The overall objective of the present invention is to provide a process for effectively decarbonizing, enhancing the color, and stabilizing wet-process phosphoric acid of virtually any grade and specifically including superphosphoric acid, thus producing marketable commercial phosphoric acid products that may be satisfactorily converted into ammonium polyphosphate liquid fertilizer using a pipe reactor. In keeping with this objective, the process hereof is capable of partially decarbonizing, enhancing the color, and stabilizing WPA having a concentration less than superphosphoric acid that is destined to be concentrated up to SPA during sequential processing using a high-temperature evaporator. Essentially, the chief aim of the process is not to completely decolorize the acid as such but instead to enhance or develop a green-colored acid. Therefore, it is not necessary to remove all the carbon from the acid, but only enough to allow for further treatment to enhance the green color and stabilize the acid.

Acid produced by the process will convert into ammonium polyphosphate liquid fertilizer that has a desirable green color and stability and that generates significantly less sludge during storage compared to conventional fertilizer produced from black-colored and conventional green, nonstabilized wet-process phosphoric acid. Specifically, the chief aims of the invention are:

a. to provide a process for chemically oxidizing wet-process acid in an economically and technically feasible manner without significantly degrading the polyphosphate content of the acid;

b. to physically or chemically enhance the color of the wet-process acid in order to produce the most desirable green-colored, low-viscosity acid of commerce without significantly promoting the formation of destabilized metallic phosphate impurities that might form sludge after conversion of the acid into liquid fertilizer;

c. to prevent purified and green-colored wet-process acid from charring or darkening in color during subsequent processing, including high-temperature evaporation and conversion into ammonium polyphosphate liquid fertilizer using a pipe reactor;

d. to provide a process that can be operated safely by those skilled in the art to minimize the production of oxides of nitrogen or other difficult-to-control toxic substances;

e. to give a process that works effectively upon various concentrations of wet-process acid, ranging from about 58% through 72%;

f. to provide a process that can be combined with existing processes for manufacturing SPA in order to reduce the energy costs, chemical defoamer usage, and phosphate losses ($P_2O_5$ losses from acid fed to the SPA evaporator) normally associated with the manufacture of SPA;

g. to produce a green-colored or color-enhanced WPA or SPA suitable for the production of ammonium polyphosphate solutions from wet-process phosphoric acid contaminated with carbonaceous material and metallic impurities;

h. to give green-colored or color-enhanced ammonium polyphosphate solutions that can be stored commercially without the precipitation of significant amounts of insoluble sludges containing ferrous phosphate; and i. to lower the fluoride concentration in wet-process acid, particularly WPA.

The aforementioned objects and aims are met in the present invention by provision of a process which broadly includes the steps of providing a quantity of wet-process phosphoric acid having a $P_2O_5$ concentration of from about 58-72%, with normal incidental carbonaceous and metallic impurities therein. This starting acid is subjected to an initial oxidation step which comprises heating the acid to a temperature of from about 400°-525° F., and adding an oxidizing agent to the acid with continuous agitation. The initial oxidation step is carried out until the acid, diluted 1:100 by weight with deonized water, exhibits an EMF of greater than about 700 mv, as compared with a standard solution of 0.01M potassium dichromate having an EMF of 600 mv.

After the initial oxidation step is completed, the acid may then be subjected to a secondary reduction step in order to reduce the valence of dark-colored oxidized metal complexes in the acid. Alternately, however, the oxidized acid may be stored and sold in that condition for further processing. This secondary reduction step can be effected by a number of processes, but is generally carried out until the acid, diluted 1:100 by weight with deionized water, exhibits an EMF of less than about 700 mv, as compared with the aforementioned standard solution.

As noted above, the process of the invention can be used with phosphoric acid having various $P_2O_5$ concentrations. In the case of low concentration acid (e.g. 42-56% $P_2O_5$), it is desirable to initially concentrate this acid by means of conventional thermal concentration techniques up to the preferred range of about 58-72% $P_2O_5$. Moreover, the starting acid should most preferably have a carbon concentration of from about 0.1 to about 1.5%, and a metallic impurity concentration of from about 1 to 5%, all on a 68% $P_2O_5$ basis.

In the initial oxidation step, the elevated temperature should most advantageously be in the range of from about 425°-450° F., and the oxidizing agent should be added to the acid over a period of time in order to minimize formation of $NO_x$ off-gases, such period typically ranging from about 15 to about 120 minutes. A wide variety of oxidizing agents can be used to good effect in the invention, but for reasons of process economy and ease of handling, the nitrates and particularly ammonium nitrate are most preferred. In the case of ammonium nitrate, such would typically be added to the acid at a level of from about 5 to 10 tons of ammonium nitrate per ton of carbonaceous impurities present in the acid.

At the conclusion of the initial oxidation step, the acid should contain less than about 1,000 ppm of carbonaceous impurities, and should exhibit a dark greenish-brown to purple color. Further, such initially oxidized acid should exhibit less than about 60% transmittance upon dilution with water to contain 18% $P_2O_5$, at 510 nm.

The secondary reduction step involves either the addition of a sufficient amount of a suitable reducing agent, or allowance of sufficient aging time in the absence of additional oxidant to lower the EMF of the acid to below 700 mv and preferably between about 650-700 mv relative to the potassium dichromate standard. Such reduced acid should also exhibit at least about 85% transmittance at 510 nm, when the acid is diluted with water to around 18% $P_2O_5$.

In the case of reduction through an aging process, such should be accomplished by continuously agitating the acid at a temperature of from about 300°-525° F. for at least about 60 minutes, to a maximum of about several days. Where a reducing agent is employed, the agent should also be added while the acid is maintained at a temperature. Either inorganic or organic reducing agents can be employed, with different temperature levels being used in each case. Such reducing agents may advantageously be selected from the group consisting of elemental metals, metal complexes of reduced iron, copper, nickel, chromium and zinc, primary and secondary alcohols, and low molecular weight ethers and aldahydes. The most preferred reducing agent comprises ferrous iron, however, from the standpoints of acid stabilization and cost effectiveness.

After the oxidation-reduction process of the invention is completed, the resulting decarbonized and color-enhanced acid is subjected to further treatment. If the acid is in the superphosphoric range of concentration (66-72% $P_2O_5$), it may be cooled to a temperature below 200° F. prior to storage and conversion into liquid fertilizer. On the other hand, if the acid is of a lower $P_2O_5$ concentration, say 58–66%, it may be directed to an evaporator for concentration up to the SPA level.

The present invention thus provides a simple and relatively inexpensive method of enhancing the color and stabilizing wet-process phosphoric acid produced from phosphate rock containing major and minor metallic impurities, including manganese, such that the metallic impurities in the product acid are stabilized in an optimized oxidation state and the product acid has the commercially desirable green color and lowered viscosity of acid typically obtained from phosphoric acid produced by a calcining process. The various concentrations of wet-process acid that are purified and enhanced in color by this invention will not unfavorably change in color or in other relevant physical and chemical properties during subsequent processing by evaporation or conversion into liquid fertilizer, and inclusion of the invention as a process modification of the existing evaporative process for the production of SPA will result in a significant cost savings through a decrease in energy costs, defoamer usage, and $P_2O_5$ losses during evaporation.

It is preferred to measure the progress of the reactions in the process of the invention by determination of the EMF of the reaction mixture. The EMF or electromotive force is a measure of the oxidation potential or oxidation state of the reaction mixture. The measured potential is a function of the oxidation state of the metallic impurities present in the wet process acid and typically ranges from 300 to 500 mv for unoxidized black-colored wet-process acid to 780–820 mv for highly oxidized decarbonized acid. All EMF values are dependent upon the strength and concentration of impurities in the wet-process acid, and in all cases samples of acid are diluted 1:100 by weight with deionized water prior to determination of EMF values.

The EMF is typically measured using a platinum electrode referenced to a standard calomel electrode. The measured EMF for all samples are relative measurements to be compared with a measured EMF of a standard solution having an EMF OF 600 mv. Mixture EMF values are relative measures of oxidation potential and are also compared to the oxidation potential of the unoxidized acid. Thus a suitable oxidant required to maintain the EMF of the reaction mixture to above 750 mv relative to the unoxidized acid having an EMF of around 400 mv must raise the oxidation potential by around 350 mv. Thus, in the initial oxidation step an oxidant must be capable of raising the EMF of the reaction mixture by at least 300 mv and preferably between 350 and 400 mv.

In the preferred process either weak 30%–54% $P_2O_5$ wet-process acid concentrated to around 58%–66% $P_2O_5$, and preferably to around 58%–62% $P_2O_5$, using a steam-heated evaporator, or 66%–72% SPA is preheated to about 400°–450° F. and continuously charged along with ammonium nitrate (AN) to a continuously stirred and heated tank reactor (CSTR) equipped with a high-efficiency, high-speed agitator and mixing baffles. The temperature of the reactor is maintained above 400° F. and preferably between 425° and 450° F. The amount and rate of addition of ammonium nitrate is proportional to the concentration of carbonaceous and metallic impurities in the acid feed and as noted typically ranges from 5 to 10 tons AN/ton of carbonaceous impurity in the acid. The residence time in the CSTR for the oxidation and decarbonization reactions is at least 30 minutes and preferably 60 minutes but will vary somewhat with the amount of carbonaceous and metallic impurities present in the acid feed. Conditions are maintaned within the reactor such that the EMF of the reaction mixture ranges from 700 to 800 mv, preferably above 750 mv, relative to the standard solution, and the decarbonized product is purple-colored. The purple-colored, oxidized acid should exhibit about 60% transmittance at 510 nm when diluted to around 18% $P_2O_5$, and should contain less than 1000 ppm carbon.

The purple-colored initially oxidized acid is then continuously transferred to a second CSTR in series where the temperature of the acid is maintained between 300° and 525° F. and the EMF of the acid is reduced to about 600–700 mv relative to the standard solution. The residual oxidant in the acid, a metallic complex that imparts a purple color to the acid, reacts with the residual carbon or other residual amounts of unoxidized trace metal complexes in the acid to lower the EMF while the acid is typically aged at around 425° F. for around 60 to 120 minutes, but may be aged for several days at the lower temperatures in the specified range. The aging time may vary in proportion to the EMF, the temperature of the acid, and to the concentration of impurities in the acid stream exiting the primary CSTR. The aging process continues until the acid attains the desired EMF and green color and/or until the acid exhibits at least 85% transmittance at 510 nm when diluted to contain around 18% $P_2O_5$.

Alternatively, if the oxidized acid is 58%–66% $P_2O_5$ WPA, it may be transferred directly to the SPA evaporator for simultaneous concentration of the WPA into SPA and enhancement of the green color. Typical residence times in the SPA evaporator are around 60 minutes, and the operating temperatures are around 360°–380° F. Aging the oxidized WPA in the SPA evaporator under these conditions produces a green color-enhanced SPA having an EMF above 600 mv.

The secondary reduction reaction is preferably carried out in a second CSTR in series with the first reactor. A suitable reducing agent may be added to the mixture in the second CSTR in an amount less than 0.0009 weight percent reducing agent for every unit weight percent $P_2O_5$ in the acid, to decrease the residence time in the tank and thus decrease the aging time required to lower the EMF, reduce the purple-colored or undesirably dark-colored metallic complexes, and stabilize the desirable green color of the acid.

The inorganic reducing agents are typically added to the hot acid having a temperature between 350° and 525° F. Addition of less than 0.0006 parts iron per part $P_2O_5$ in the acid mixture lowers the residence time in the second CSTR from 60 to 120 minutes to around two to five minutes while lowering the EMF from around 750 mv to around 630 mv and enhancing the green color of the acid. Back titration with unoxidized black acid containing ferrous iron impurity equivalent to 0.003 parts iron per part $P_2O_5$ in the acid mixture also satisfactorily lowers the residence time to around ten minutes, while lowering the EMF to around 650 mv and producing an emerald green-colored acid.

Organic compounds (e.g., parimary alcohols such as methanol and secondary alcohols such as isopropyl alcohol, ethers similar to diethylether, and aldehydes such as formaldehyde) may be used as reducing agents. Organic compounds are typically added to the cooled acid having a temperature between 75° and 150° F. or are added to the acid at a temperature below the boiling point of the organic compound. The preferred organic reducing agent is isopropanol; addition of less than 0.0005 parts isopropanol per part $P_2O_5$, in the acid effectively enhances the green color of the acid within two minutes after addition at 100° F.

Addition of a suitable reducing agent continues until the acid attains the same desirable color, EMF, and maximum transmittance achieved by the previously described aging operation. However, less than 0.0009 weight percent reducing agent per percent $P_2O_5$ in the acid should be added in the second stage of the process in order to maximize the stability of the acid.

IN THE DRAWINGS

FIGS. 1—1 and 1—2 in combination present a schematic flow diagram illustrating a preferred two-stage reaction apparatus of either the batch mode or continuous variety for carrying out the process of the present invention;

Figure 10:
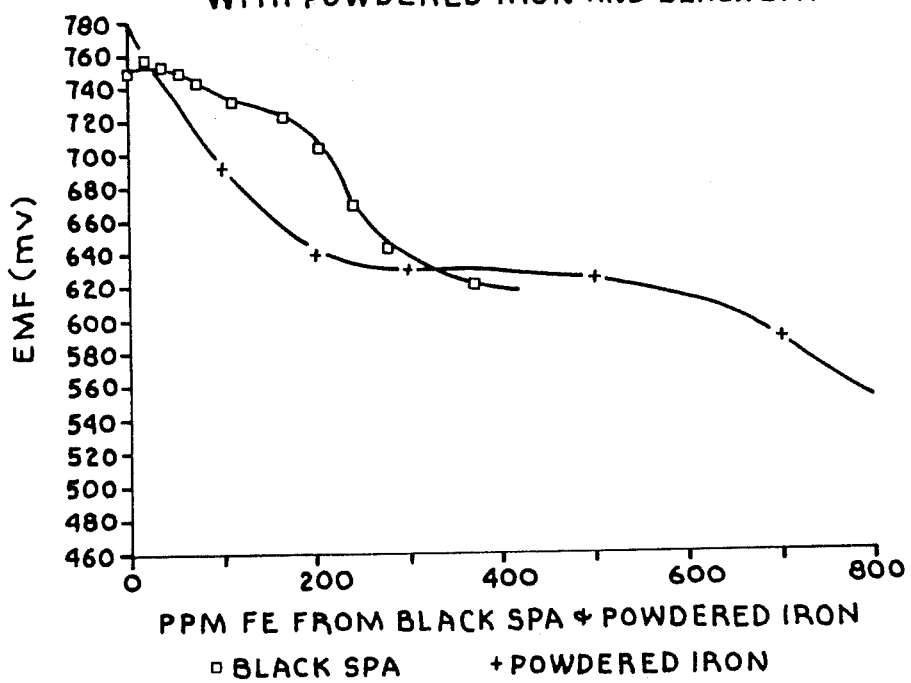
Figure 11:
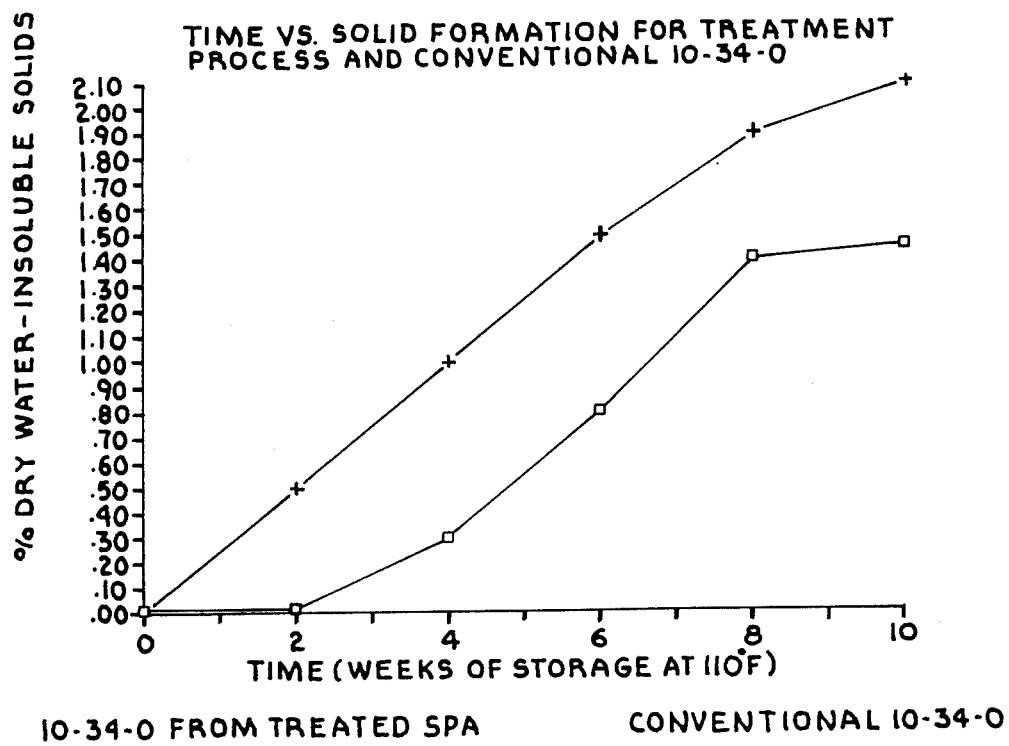

FIG. 10 is a graph illustrating the effects of the addition of reducing agents in the form of metallic iron and unoxidized black acid containing ferrous acid upon the EMF of decarbonized and color-enhanced acid; and FIG. 11 is a graph setting forth the stability of an ammonium polyphosphate liquid fertilizer prepared from decarbonized, color-enhanced, and stabilized green SPA produced in accordance with the invention, as compared with liquid fertilizer prepared from conventional SPA.

DESCRIPTION OF THE PREFERRED EMBODIMENTS

The treatment process of the present invention is both an improvement in the conventional procedure for preparing SPA and a means of enhancing the green color and stabilizing SPA for use in production of various final products including ammonium polyphosphate liquid fertilizer compositions, and similar nutrients. During the conventional procedure for the production of SPA, phosphate rock, or apatite ore containing metallic, nonmetallic, and organic impurities is acidulated with sulfuric acid and the resulting calcium sulfate removed from the acid liquor by filtration. However, a portion of the impurities in the rock is dissolved or suspended in the resulting wet-process phosphoric acid.

The major inorganic impurities present in the acid consist of compounds and complexes containing calcium, magnesium, aluminum, iron, silicon, fluorine, and sulfate, while the minor or trace inorganic impurities contain metals such as manganese, vanadium, zinc, chromium, and uranium. The major organic impurities contain acid-soluble and acid-insoluble carbonaceous compounds derived from humic acids, bitumins, and keratins.

The major and minor metallic impurities present in conventional wet-process phosphoric acid contribute to the formation of metal phosphate sludges in ammonium phosphate liquid fertilizers. The metallic impurities also determine the color of the wet-process acid and products manufactured from the wet-process acid such as liquid fertilizer. The stability, tendency to promote sludge formation, and color of the metallic impurities are related to the oxidation state of the metals in the impurities, a parameter determinable directly or indirectly by many acceptable techniques including the measurement of the Electromotive Force or Potential (EMF) of the wet-process acid.

The acid-soluble and acid-insoluble organic impurities char in the acid during conventional processing, forming black-colored, opaque carbonaceous floc or colloidal material that reduces the clarity of the acid, hinders the removal of metallic impurities, increases the viscosity of the acid, and carries over into products manufactured from wet-process acid such as liquid fertilizer. Most important, the black-colored floc severely reduces the commercial marketability of wet-process acid used to manufacture liquid fertilizer.

During concentration of the wet-process acid following removal of gypsum, the elevated temperatures used in the evaporation steps create a reducing environment which promotes the formation of lowered oxidation-state metallic impurities, such as ferrous and manganese II complexes rather than ferric and manganese III phosphate, and char the carbonaceous material to form the black-colored, opaque floc. The reduced carbonaceous material forms a matrix that entraps gases released during evaporation, resulting in an extensive amount of stabilized foam. The foam reduces the rate of concentrated acid production through the conventional process equipment and increases the losses of wet-process acid during production. Antifoam products and defoaming chemicals are typically added during conventional processing to minimize foam production and thus minimize the loss of product.

Furthermore, 30%–54% ($P_2O_5$ basis) low-magnesium phosphoric acid is typically concentrated directly to 66%–72% ($P_2O_5$ basis) SPA using a dedicated superphosphoric acid evaporator heated by natural gas fuel to temperatures greater than 350° F. The gas-heated superphosporic acid evaporator is better able to process viscous acid having a great tendency to foam at high temperatures compared to a lower-temperature, steam-heated evaporator. The steam-heated evaporator cannot generate a high enough temperature to concentrate the acid above 62% ($P_2O_5$ basis) during an economically and commercially viable time period. However, a savings would be realized if conventional steam-heated evaporation equipment could be used to concentrate wet-process acid up to 58%–62% ($P_2O_5$ basis) before using the gas-heated superphosphoric acid evaporator to further concentrate the acid to SPA. Alternatively, the treatment process could be used to treat all concentrations of WPA between 58% and 66% $P_2O_5$ and achieve some or all portions of the savings described for 58%–62% $P_2O_5$ WPA. The basis for the savings is the significantly lower cost of steam generated on site as a by-product of the production of sulfuric acid compared to natural gas fuel. A reasonable estimate of the value of the energy savings for this process modification is around $3.50/ton of 58%–62% ($P_2O_5$ basis) wet-process acid or $6/ton $P_2O_5$ produced by the operation.

By itself, the above evaporation process modification could be inconvenient to implement; however, the treatment process of this invention may be easily implemented using 58%–62% ($P_2O_5$ basis) wet-process acid and thus take advantage of the above evaporation process improvement while partially decarbonizing, color-enhancing, and stabilizing the acid prior to further concentration up to SPA in the superphosphoric acid evaporator. The treatment process hereof destroys the carbonaceous matrix and stabilizes the oxidation state and color of the trace metal impurities present in the acid while lowering the viscosity of the acid. The purified and stabilized acid could be further processed at a higher throughput using existing superphosphoric acid evaporation equipment without the addition of any antifoam chemicals while significantly reducing product losses. Antifoam chemical consumption is typically reduced between 15% and 25%, and $P_2O_5$ evaporative losses are typically reduced from between 3% and 5% to less than 1% using the treatment process of the invention as compared to conventional evaporative concentration of black-colored wet-process acid. Typical savings resulting from the invention are expressed in 1985 dollars and are around $1/ton SPA or $1.50/ton $P_2O_5$ produced for the reduction in antifoam usage and around $8.50/ton SPA or $12.50/ton $P_2O_5$ for the reduction in product losses associated with the production of SPA. The treatment process itself increases operating costs by less than $8/ton $P_2O_5$, including the cost of capitalization, labor, energy, and $NH_4NO_3$ oxidant. Therefore, implementation of the invention using 58% to 62% ($P_2O_5$ basis) wet-process acid typically reduces the operating costs associated with the production of SPA by around $12/ton $P_2O_5$, while producing a superior product that will convert into a clear, green, stabilized ammonium polyphosphate liquid fertilizer.

As an added advantage, the treatment process effectively removes fluoride from 58%–72% $P_2O_5$ acid. Between 20% and 75% of the fluoride is typically removed from 58%–66% $P_2O_5$ WPA during the process. Twenty percent to 25% of the fluoride may also be removed from 66%–72% $P_2O_5$ SPA during the process, but removal of the fluoride is optimized using 58%–66% $P_2O_5$ WPA. It is known that the presence of greater than 0.1 weight percent fluoride in 10-34-0 grade ammonium polyphosphate liquid fertilizer will promote the formation of sludge in the fertilizer during storage. Use of the treatment process results in the presence of less than 0.1 weight percent fluoride in 10-34-0 grade liquid fertilizer manufactured from treated green color-enhanced and stabilized acid. Treatment of 58%–66% $P_2O_5$ WPA with the process will thus reduce the fluoride concentration in the WPA without removing any beneficial polyphosphate from the treated WPA, since the great majority of polyphosphate is formed during concentration of WPA up to SPA in the SPA evaporator.

Overall product stability is related to the EMF of acid and is a measure of two independent characteristics: color stability and the tendency of the metallic impurities in the acid to form metal phosphate sludges after conversion into ammonium phosphate liquid fertilizers. Color-stabilized phosphoric acid will not appreciably change in color during subsequent processing after the treatment process of the present invention. Stabilized green-colored phosphoric acid produced by the treatment process hereof will not darken or char during concentration or conversion into liquid fertilizer. On the one hand, color stability is enhanced by maintaining the EMF of acid produced by the treatment process below 700 mv, and preferably between 650 and 550 mv, relative to the potassium dichromate standard or to black acid having an EMF of 400 mv. On the other hand however, sludge formation is minimized by maintaining the EMF of acid prepared by this process at or above 650 mv, and preferably above 700 mv, relative to the standard or to the black acid having an EMF of 400 mv. Typical wet-process acid containing sufficient manganese impurities and having an EMF above 700 mv would be purple-colored and would not have the desirable green color typically found in the commercial wet-process acid produced from calcined rock. WPA produced from Florida rock and decarbonized by a typical single-stage oxidative process has a high EMF and a nonstabilized color usually ranging from brown to purple. The color is unpredictable and unstable in acid having an EMF greater than 700 relative to 400 EMF unoxidized acid, and the color may change and darken in an unpredictable manner during subsequent processing, thus reducing the marketability of the acid or liquid fertilizer produced from the acid. Therefore, in order to best accommodate the goals of color stability and minimal sludge formation it is desirable to maintain the EMF of the finished acid between 600 and 700 mv, preferably between 650 and 700 mv, relative to the standard.

Essentially the same treatment process and process equipment used to purify 58% to 62% wet-process acid may be used to partially decarbonize, enhance the color, and stabilize 62%–66% WPA and 66%–72% ($P_2O_5$ basis) SPA. Process conditions such as temperature and pressure are independent of the feed acid $P_2O_5$ concentration over the range from 58% to 72% $P_2O_5$, while the amount of oxidant and the optimum reaction time depend upon the concentration of carbonaceous material and metallic impurities present in the acid. Product characteristics, such as $P_2O_5$ concentration, acid polyphosphate concentration, and viscosity, vary with the strength of the feed acid. The EMF of the final stabilized green-colored acid, however, should preferably be between 700 and 600 mv relative to the standard regardless of the $P_2O_5$ concentration in the feed acid stream.

Figure 1:
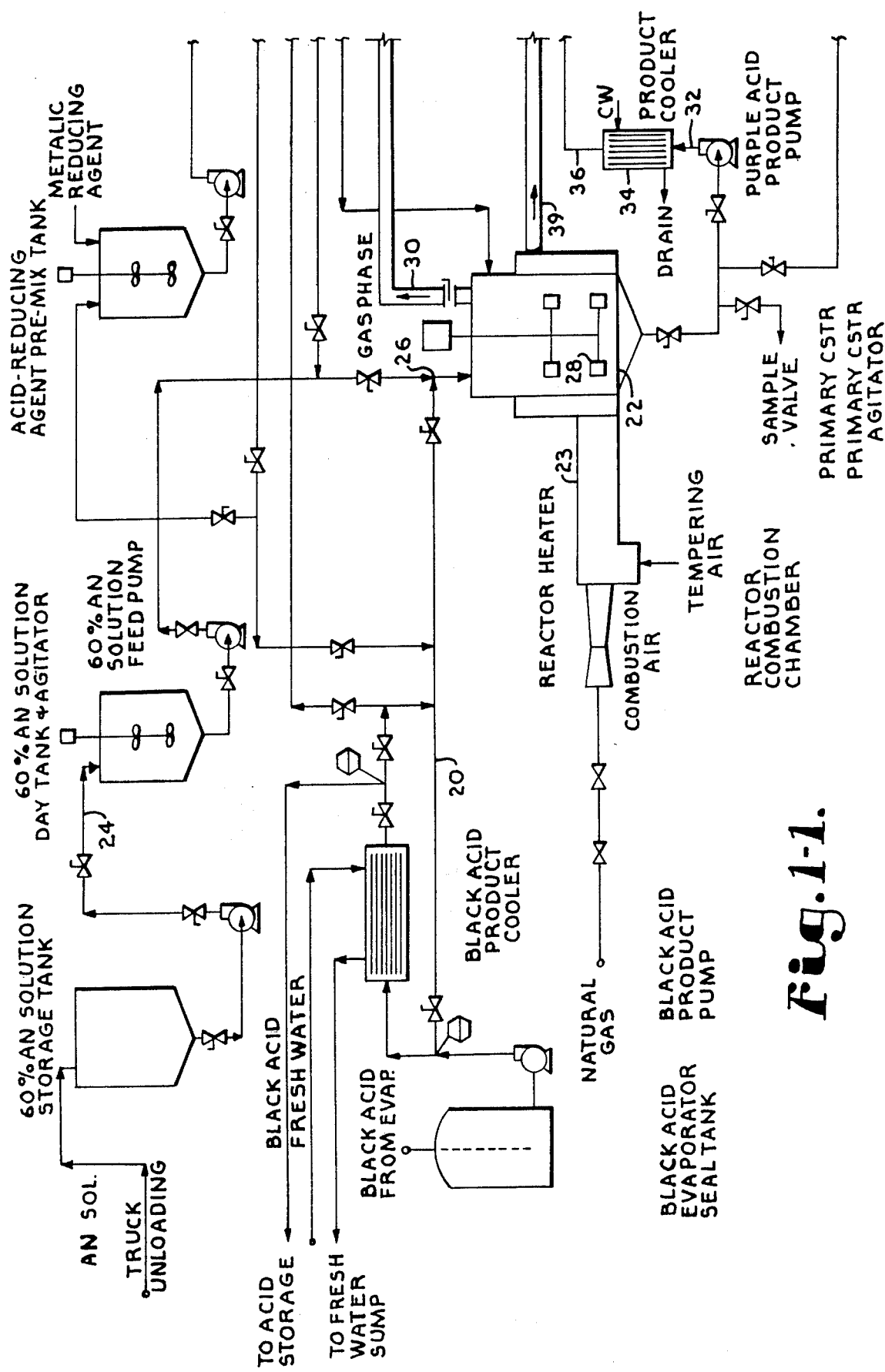
FIG. 1b is a schematic representation of a preferred two-stage apparatus carrying out the present invention using orthophosphoric acid as a starting material.
FIGS. 1c and 1d illustrate laboratory scale apparatus used to demonstrate the processes of the invention.

Attention is next directed to the schematic flow diagram of FIG. 1. Either 58% to 66% black-colored wet-process phosphoric acid or 66%–72% SPA feed is directed via line 20 to the primary jacketed and vented stirred tank reactor 22. Reactor 22 can be designed for batch-mode operation, or be a continuously stirred tank reactor (CSTR) for continuous operation. A gas fired heater 23 is coupled to reactor 22 for temperature maintenance. $NH_4NO_3$ is directed via line 24 to an in-line mixing tee 26 for premixing with the acid feed, or it may be added directly to reactor 22. The reactor 22 is equipped with a high-speed turbine 28 and static mixing baffles (not shown) and gaseous overhead from the unit flows through line 30. The optimum temperature range, vigorous mixing conditions, and proper weight ratio of oxidant to incoming acid feed should all be achieved to maintain the EMF of the reaction mixture above 700 mv, and preferably above 750 mv, relative to the incoming acid feed or to the potassium dichromate standard and to maintain the combined concentration of NO and $NO_2$ in the overhead from the primary reactor 22 in line 30 below 1.0 weight percent and preferably below 0.10 weight percent.

The satisfactory temperature of the mixture in the primary reactor 22 may range from greater than 400° to 525° F., but the optimum temperature range is between 425° and 450° F. The efficiency of the oxidation reaction is reduced at temperatures below 410° F., while reaction temperatures above 450° F. may promote the undesirable formation of metaphosphate.

Sufficient oxidant must be added to the primary reactor to raise the EMF to above 700 mv or to increase the EMF by at least 300 mv relative to the standard or to the black acid feed. The absolute weight addition of oxidant depends upon the choice of oxidant and the characteristics of the feed but typically ranges from 5 to 10 tons AN/ton of carbonaceous impurity (as carbon measured by $CO_2$ evolution method in acid).

Vigorous mixing conditions in the primary reactor ensure intimate contact between the oxidant and the impurities in the acid and therefore influence the rate of addition of AN and the residence time for the first stage of both the batch and continuous treatment processes. Adequate mixing should be provided to maintain highly turbulent conditions at all zones within the reaction mixture. Under optimum mixing conditions, the residence time for the first stage in a continuous process using a primary CSTR should be between 15 and 90 minutes, preferably 60 minutes, but may be longer and is dependent upon the amount of impurities in the acid feed.

The rate of the addition of the preferred ammonium nitrate oxidant should be maintained as to minimize the generation of NO and $NO_2$ and maximize the generation of $N_2$ during the oxidation of metallic and carbonaceous impurities. The rate of addition of AN for a batch process ranges from 15 to 120 minutes for the addition of all of the required amount of AN. Insufficient residence time brought about by too rapid addition of AN promotes foaming and enhances the decomposition of AN into $NO_x$ by-products, resulting in a decrease in oxidation efficiency, an increase in the amount of oxidant necessary for the process, and unacceptable levels of $NO_x$ in the overhead gas stream. Decomposition of AN at a low EMF typically generates NO, $NO_2$, and nitrogen while decomposition at high EMF (700 mv and above) produces $N_2O$ and nitrogen. Oxidation efficiency is significantly lowered compared to preferred operation by a high rate of addition—resulting in a residence time of less than ten minutes—and to a low (below 500) EMF reactor heel during the continuous treatment process. The reaction should continue or sufficient residence time should be allowed in the primary reactor 22 to reduce the carbonaceous concentration in the acid to below 1000 ppm or until the weight ratio of carbonaceous material to $P_2O_5$ in the acid is less than 0.0015.

Satisfaction of the above criteria ensures that an adequately decarbonized, purple-colored acid will be produced during the first stage of the process. The appearance of the purple color during the oxidation stage is unexpected. The prior art cautions that acid should not be heated above 400° F. during or after decarbonization with AN to prevent the darkening of the decarbonized acid brought about by the charring of residual carbon in the acid. The dark purple color of the acid that appears as a result of the initial oxidation step of the present process does not form until after sufficient carbon has been removed from the acid by oxidation and is probably the result of the formation in the acid of highly oxidized, purple-colored manganese and possibly vanadium and ferric phosphate complexes. Such complexes would not form until after removal of a significant amount of the carbonaceous impurities in the acid and attainment of at least an EMF of 700 mv relative to the black acid having an EMF of around 400 mv; thus the darker purple color is not related to the charring of residual carbonaceous material during subsequent processing at temperatures greater than 400° F.

The intensity of the purple color is one indication of the satisfactory completion of the reactions in the first stage of the process. Therefore, oxidation conditions should be maintained in the primary reactor 22 until the acid exhibits maximum or near maximum transmittance in the purple-colored spectrum at 400 nm and near minimum transmittance in the green-colored spectrum at 510 nm before treating the acid during the second stage of the process.

Oxidation of carbonaceous and metallic impurities occurs during the first stage of the process in the primary reactor 22, and the most easily oxidizable compounds, including the iron II complexes, react prior to the carbonaceous material and the manganese II complexes. The order of reactivity depends upon the nature, composition, and concentration of impurities in the acid feed. This order of reactivity for typical black-colored wet-process phosphoric acid obtained from Florida rock is probably iron II complexes > vanadium III complexes > humic acids, keratins, bitumins > residual chemical defoamer > elemental carbon > manganese II complexes.

The oxidation chemistry depends in turn upon the nature and concentration of both the impurities and the oxidants and may be characterized by the EMF of the mixture. A variety of materials may act as effective oxidizing agents in the first stage of the treatment process, including halides such as chlorine, bromine, and iodine and salts of the halide oxyacids such as sodium hypochlorite and sodium perchlorate; potassium permanganate; hydrogen peroxide; sodium dichromate; gases such as oxygen, nitrous oxide, and ozone; and nitrate- or nitrite-containing compounds such as potassium nitrate and nitrite, sodium nitrate and nitrite, nitric acid, and ammonium nitrate. Typically, all of the above oxidants exhibit one or more major disadvantages compared to ammonium nitrate when used in the treatment process including corrosivity to process equipment; high cost for use; effectiveness dependent upon the use of capital-intensive, high-pressure equipment; toxicity or deposition of toxic by-products in the product; and the tendency to produce a large quantity of toxic by-product gases requiring the use of auxiliary pollution control equipment. Therefore, ammonium nitrate is the preferred oxidant for the first stage of the treatment process.

Analyses of both the reaction mixture and the by-product gases evolved during the first stage of the process using $NH_4NO_3$ as the oxidant support the above reactivity sequence and indicate the occurrence of the following reactions:

$NH_4NO_3 + 2H^+ + 2Fe^{2+} \rightarrow NO_2 + 3H_2 + 2Fe^{3+} + NO$     1.

$NH_4NO_3 + 2H^+ + 2Fe^{2+} \rightarrow N_2 + H_2O + 2Fe^{3+}$     2.

$NH_4NO_3 + C \rightarrow N_2 + CO + 2H_2O$     3.

$2NH_4NO_3 + C \rightarrow 2N_2 + CO_2 + 4H_2O$     4.

$2Mn^{2+} + 4H_4P_2O_7 + 3NH_4NO_3 + 2C \rightarrow 2Mn(NH_4)(H_2P_2O_7)_2 + 4H_2O + N_2O + 2CO_2 + 4H^+ + N_2$     5.

$NH_4NO_3 \rightarrow N_2O + 2H_2O$     6.

$NH_4NO_3 \rightarrow N_2 + 2H_2O + \tfrac{1}{2}O_2$     7.

The progress of the oxidation reactions occurring during the initial oxidation step is depicted in FIGS. 3–9, which all describe a batch process operation.

During the batch-mode process, oxidant added to the wet-process acid at a temperature greater than 400° F. reacts immediately with ferrous complexes to form ferric complexes, nitric oxide, nitrous oxide, nitrogen, and water. The EMF of the mixture slowly rises during the production of ferric complexes. The EMF rapidly rises during the oxidation of carbonaceous material into $CO_2$ and CO, and the predominant by-product gas species is nitrogen. Oxidation of a colorless metallic complex such as manganese II complex occurs above an EMF of 700 mv to produce a purple-colored metallic complex such as manganese III complex while producing $N_2O$ and nitrogen by-product gas. The manganese II or similar metallic complex usually does not react until the concentration of carbonaceous material has been lowered below 1300 ppm and the EMF of the mixture rises above 700 mv. Thus the appearance of the purple color in the reaction mixture is an indicator of the progress of the oxidation reaction. The reaction mixture will only reach a maximum EMF of 780–820 relative to the standard or to the black acid during the addition of $NH_4NO_3$ oxidant. The value of the maximum EMF is porportional to the nature and concentration of the least readily oxidized impurity, which is probably manganese II in this example. Addition of $NH_4NO_3$ to a batch mixture having an EMF greater than or equal to 780 mv after complete oxidation of the manganese II complex will not significantly increase the EMF of the acid and will result in decomposition of the oxidant into $N_2O$ and nitrogen. Further addition of AN oxidant at this point will not significantly decrease the carbon concentration of the acid. Therefore, the simultaneous rapid increase in $N_2O$ and decrease in $CO_2$ in the by-product gas that occurs at this point is an indication of the completion of the first-stage oxidation reactions.

Returning to FIG. 1a, the purple-colored liquid stream exiting the primary reactor 27 is transferred with the aid of the primary pump through line 32 to an optional acid cooler 34. The acid exits the cooler 34 through line 36 to the secondary reactor 38. The secondary reactor 38 may be a batch mode reactor or CSTR, is jacketed for temperature control, and is maintained at the same pressure as the primary reactor 22 and is equipped with a high-speed turbine mixer and mixing baffles. Reactor 38 is also heated by heater 23, via combustion gas transfer line 39 coupling the respective reactor jackets.

The overhead from the secondary reactor 38 passes through line 40 and is combined with the vapor stream from the primary reactor 22 in line 30. The combined vapor stream from the two reactors 22, 38 is mixed with the combustion gases from the gas-fired heater 23 in line 42 and is transferred downstream to conventional fluoride recovery and fluoride scrubbing systems prior to exiting to the atmosphere. Alternatively, the combined vapor stream from the two reactors may first be transferred to existing fluoride recovery systems and then mixed with the combustion gases within the gas-fired burner 23 in order to destroy any residual $N_2O$, and the combined stream may be drawn to the stack with a suitable exhaust fan, where the gases exit to the atmosphere. The concentration of $NO_x$ compounds in the combined gas stream is typically less than 100 ppm.

The oxidized acid entering the secondary reactor 38 typically has an EMF greater than 400 mn relative to the standard and unoxidized acid having an EMF of about 400 mv and is usually dark purple in color because of the presence of the metallic oxidation complex. The complex may contain manganese, vanadium, or iron but typically contains a manganese III compound when produced from Florida phosphate rock. As previously mentioned, the presence of a stable, intensely purple-colored manganese complex is quite unexpected and may be unique to acid produced from phosphate ore containing greater than 100 ppm manganese II. Manganese III complexes are strong oxidants and are reported in the literature to be very reactive and thus unstable in moderately concentrated acidic solutions. The manganese III complex formed during the present treatment process is unique because of its enhanced stability at temperatures greater than 300° F. in strong phosphoric acid. Manganese III is most probably stabilized in the acid by interaction with phosphoric acid molecules to form the complex. Unlike AN, the manganese III complex remains relatively stable in the acid at high temperatures and EMF and does not immediately decompose into $N_2O$ or other similar by-products without reacting with low levels of reduced compounds such as carbon. The driving force for any oxidation reaction is related to the concentration of all reactants within the reacting media and the temperature of the reaction mixture. AN is not an effective oxidant for the removal of very low levels of residual carbon under the optimum process conditions of temperature and EMF, because the low concentration of carbon decreases the driving force for the oxidation reaction. Decomposition of AN is favored over decarbonization under these conditions, since the decomposition of AN occurs spontaneously at temperatures greater than 390° F.

Figures 1, 2:
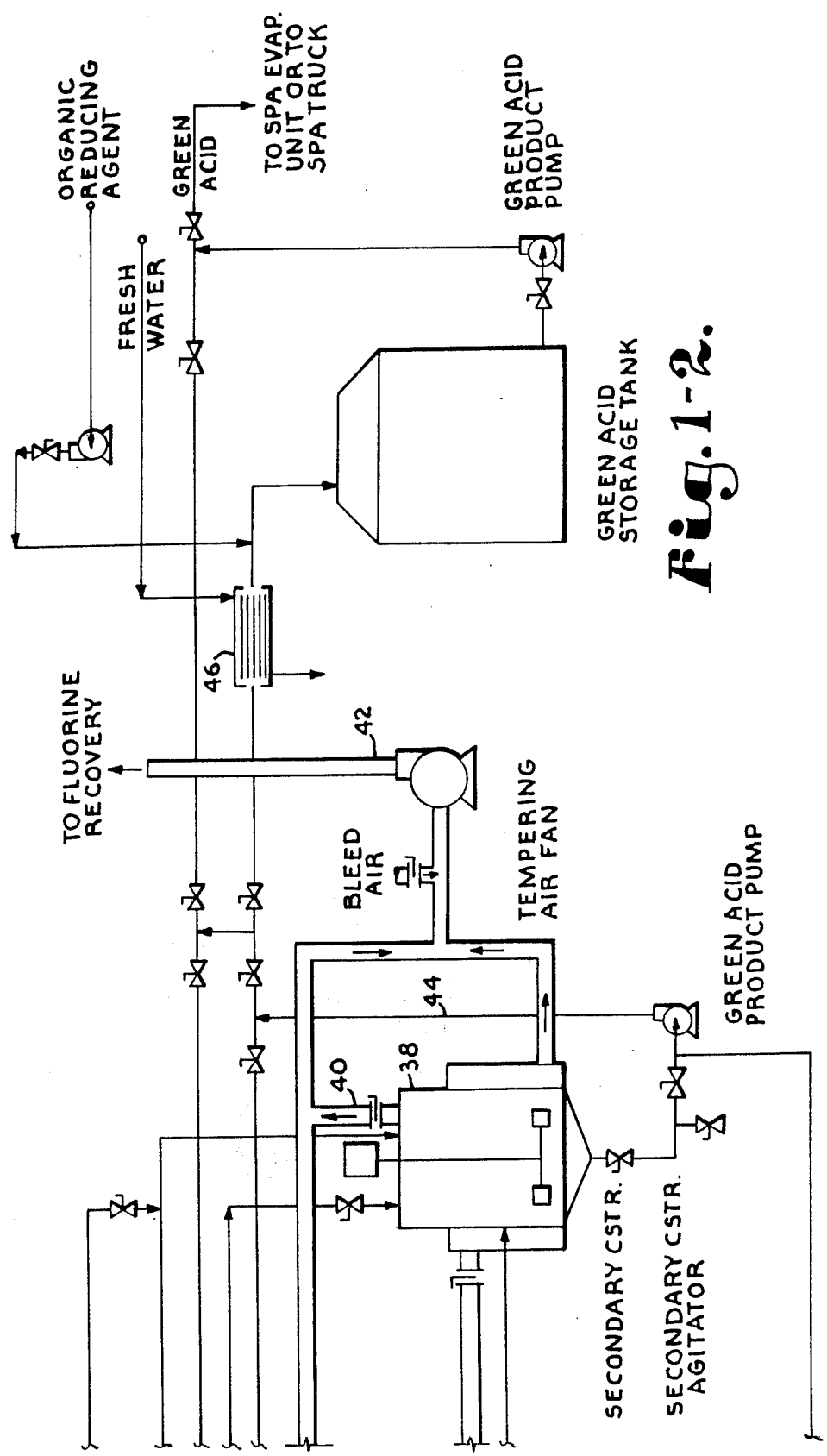
FIG. 2 is a graphical representation of the effect of the addition of ammonium nitrate upon acid EMF, carbon concentration, and viscosity over the time periods of batch-mode decarbonization, color enhancement, and stabilization of SPA.
Figure 5:
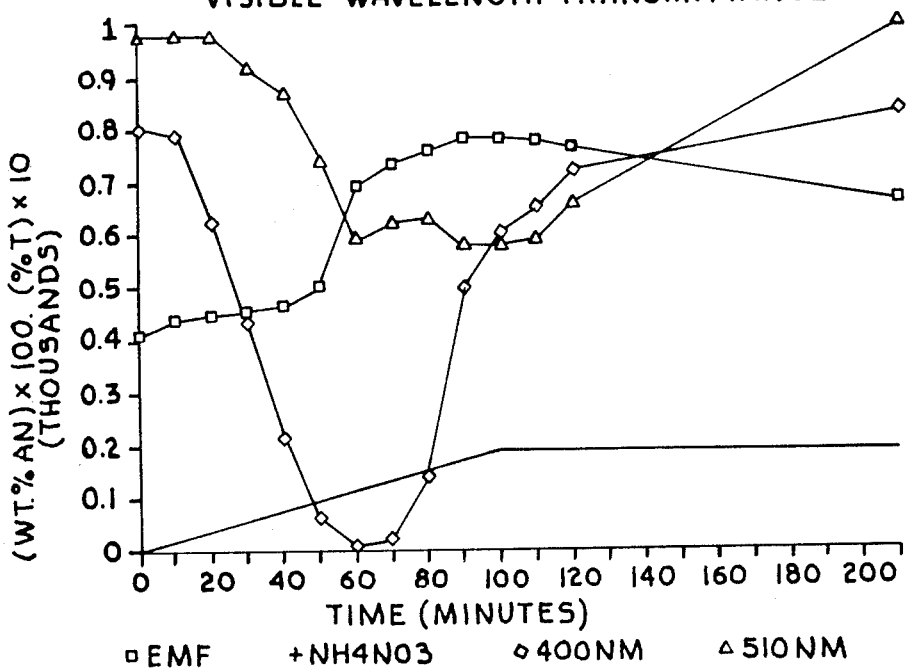
FIG. 5 is a graph setting forth the change in the green color spectrum occurring in the acid during the course of the batch-mode process of FIG. 2.
Figure 6:
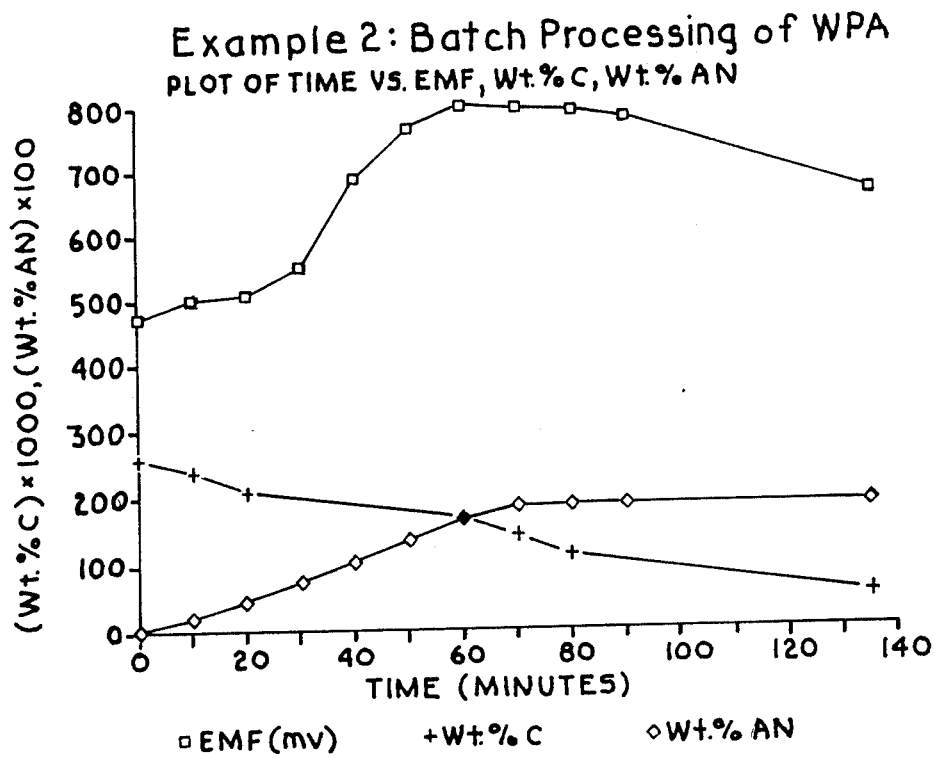
FIG. 6 is a graph illustrating the effects of the addition of ammonium nitrate upon acid EMF, and carbon concentration, over the time period of batch-mode decarbonization, color enhancement, and stabilization of orthophosphoric acid.

The purple manganese III complex and other similar complexes, however, are stable at high temperatures and will effectively oxidize residual, low levels of carbon present in the acid mixture that are not oxidized by AN in the first stage of the treatment process. This is an enhancement of the process, in that the metallic oxidant may be used to lower the concentration of carbonaceous material in the acid to the desirable level instead of adding any additional AN under conditions which would favor decomposition. Therefore, formation and utilization of the purple metallic oxidation complex reduces the amount of AN necessary for the treatment process. Utilization of the purple-colored complex as an in situ oxidant to remove residual carbon may occur in the second reactor during the secondary reducing phase of the treatment process. As shown in FIGS. 2 and 6, the concentration of carbon in the acid continues to decline with time after cessation of the addition of AN. The decline in the carbon concentration in the acid is proportional to the reduction in the EMF of the acid and the enhancement of the green color of the acid. The development of the green color of the acid during the secondary stage is more clearly illustrated by the data in FIGS. 2, 4a–n, and 5 for SPA and FIGS. 6, 8a–k, and 9 for WPA.

The primary purpose of the secondary stage of the treatment process is to enhance the green color of the acid and stabilize the acid by reduction of the highly oxidized, purple-colored metallic complexes. Reduction of the complex can occur by the addition of a suitable reducing agent to the acid or by allowing sufficient time in the process for the in situ metallic oxidant to react with residual low levels of carbon remaining in the acid from the primary treatment stage.

In the secondary stage of the preferred process, the purple-colored decarbonized acid is aged at a temperature between 300° and 525° F. in the secondary reactor 38 for a sufficient amount of time to allow the purple-colored metallic complex to react with residual carbonaceous material. The aging time may vary in proportion to the EMF of the acid, the temperature of the acid, and the concentration of the acid stream exiting the primary reactor or CSTR.

Alternatively, the aging operation may be carried out in the SPA evaporator when the treatment process is used to enhance the color and stabilize 58%–66% $P_2O_5$ WPA. The initially treated acid is in that case sent directly from the primary reactor 22 to the SPA evaporator (not shown).

The aging time will usually increase with an increase in the EMF, the concentration of manganese III phosphate and similar compounds and residual carbon in the acid stream exiting the primary reactor, and at the lower end of the acceptable temperature range. The acid is typically aged at 425° F. for around 60 to 120 minutes and for 36 to 48 hours at 300° F. The aging process continues until the acid obtains the desired EMF and green color. The desirable green color demonstrated by optimally color-enhanced acid is described subjectively as olive green or emerald green or another color similar to the color of phosphoric acid produced from calcined western apatite rock. Proper color-enhanced acid should exhibit at least 85% transmittance at 510 nm diluted with water to contain around 18% $P_2O_5$ (3 g acid/10 ml $H_2O$ for 68% $P_2O_5$) as measured using a scanning UV/Vis spectrophotometer.

The enhanced green color of the acid initially becomes apparent during the secondary treatment process once the EMF of the acid has fallen below about 750 mv relative to the standard or to the unoxidized black acid. The enhanced green color, however, is not fully stable as long as the EMF of the acid is between 750 and 700 mv. As mentioned earlier, color-enhanced green acid having an EMF greater than 700 mv may darken to a purple color when transferred at a temperature greater than 300° F. during storage and transportation operations. Contacting the acid with air or other suitable oxidant under the above conditions may be sufficient to reform the purple metallic phosphate complex. Apparently, there exists a transition range for the formation of the purple-colored complex that is mirrored by the EMF range in the acid between 650 and 750 mv. The green, color-enhanced acid will remain stable and green-colored as long as the EMF of the acid exiting the secondary treatment process is less than around 700 mv. As mentioned earlier, the tendency of the acid to form metal phosphate sludge during storage or upon conversion into liquid ammonium phosphate fertilizer increases as the EMF of the acid decreases. Decreasing the EMF of the acid below 550 mv, for example, may promote the formation of sludge during storage. Therefore, overall stability of the acid is ensured by the secondary stage of the treatment process by allowing sufficient aging time in the absence of AN oxidant to lower the EMF of the acid between 600 and 700 mv and preferably between 650 and 700 mv relative to the potassium dichromate standard or to the black unoxidized acid having an EMF of around 400 mv.

A suitable reducing agent may be added to the secondary reactor 38 in the secondary stage of the treatment process in order to react with the highly oxidized purple-colored metallic complexes and shorten the aging or residence time required to produce green, color-enhanced acid. Suitable reducing agents, which include inorganic metals and metal complexes, sulfur and sulfur compounds, and various organic ethers, alcohols, aldehydes, and carboxylic acids, are themselves potential impurities and must be carefully added in an amount less than that which would darken or promote sludge formation in the acid or acid products derived from the acid during subsequent processing. The maximum amount of reducing agent that may be added to the acid in the secondary reactor 38 is dependent upon the nature of the reducing agent and the concentration of impurities in the acid exiting the primary stage of the treatment process, but the maximum limit is typically less than 0.0009 weight percent reducing agent for every unit weight $P_2O_5$ in the acid. Effective inorganic reducing agents include but are not limited to reduced iron, copper, nickel, chromium, and zinc.

The most suitable inorganic reducing agents contain reduced iron or ferrous iron. Inorganic reducing agents including reduced iron and ferrous iron are typically added to the hot acid having a temperature between 350° and 525° F. As mentioned previously, addition of less than 0.0006 parts reduced iron per part $P_2O_5$ in the acid lowers the residence time for the secondary stage of the process from 60 to 120 minutes to around 2 to 5 minutes while lowering the EMF from around 750 mv to around 630 mv while enhancing the color of the acid to produce an emerald green-colored acid having at least 85% transmittance at 510 nm. Addition of unoxidized black acid containing ferrous iron impurity equivalent to 0.0003 parts iron per part $P_2O_5$ in the acid also satisfactorily lowers the residence time to around ten minutes while lowering the EMF from around 750 mv to around 650 mv and producing a green-colored acid.

The effect of the addition of reduced iron and ferrous iron upon the EMF of highly oxidized purple-colored acid containing oxidized metal phosphate complexes including manganese III phosphate complex is shown in FIG. 10. The reducing agents were all added to acid heated to around 425° F. The upper curve represents the effect of the addition of black unoxidized SPA containing around 0.25% carbonaceous material (as carbon) and about 1.9% ferrous iron upon the EMF of the acid. The EMF was gradually lowered from 780 mv to 620 mv after the addition of 2 weight percent unoxidized black SPA to a heel containing purple-colored, highly oxidized SPA. The black acid contributed about 0.038 weight percent or 380 ppm ferrous iron and about 0.0050 weight percent or 50 ppm carbon to the mixture. The lower curve represents the effect of the addition of reduced iron powder upon the EMF of the acid. Here the EMF was lowered from 780 mv to around 625 mv after the addition of around 400 ppm iron. In both examples the color of the acid changed from dark purple to emerald green at around 720 mv.

The addition of reduced iron and ferrous iron chemical-reducing agents to achieve a green color-enhanced acid having an EMF between 600 and 700 mv does not significantly destabilize the acid or products, including ammonium phosphate liquid fertilizer, derived from the acid during a typical period of commercial storage.

It is unexpected that the addition of the iron impurities would not affect the stability of the acid during storage, because the literature teaches that iron, and especially ferrous iron, will promote the formation of ferrous ammonium phosphate solids or sludges in ammonium phosphate liquid fertilizer. During the treatment process, the 1 to 2 weight percent ferrous iron impurity present in the black unoxidized acid is stabilized by oxidation to ferric iron, which does not readily promote the formation of sludges in liquid fertilizer. Addition of reduced iron may add 400 ppm or so ferrous iron to the decarbonized and color-enhanced acid produced during the treatment process, but the quantity represents only a small percentage of the iron already stabilized in the ferric form by the treatment process. Addition of black acid containing ferrous iron during the secondary stage of the treatment process to reduce the purple-colored metal phosphate complex produces ferric iron as a by-product of the reaction, which does not destabilize liquid fertilizer. The 50 ppm carbonaceous material present in the black acid is not enough to darken or influence the color of the acid during subsequent processing. Therefore, addition of iron-reducing agents to produce a color-enhanced and stabilized acid having an EMF between 600 mv and 700 mv relative to the black acid having an EMF around 400 mv does not negatively affect the product quality.

Organic reducing agents including but not limited to primary and secondary alcohols such as methanol and isopropanol, ethers such as diethyl ether, and aldehydes similar to formaldehyde may also be added to enhance the color of the acid in the secondary stage of the treatment process. As mentioned previously, suitable organic reducing agents are typically added to the cooled acid having a temperature between 75° and 150° F. The residence time and reaction time required for the color enhancement and stabilization of the highly oxidized acid are functions of the chemical reducing agent. Addition of methanol to SPA maintained at 80° F. required for four days to lower the EMF from 780 mv to 555 mv relative to black unoxidized acid having an EMF around 400 mv. Addition of less than 0.0005 parts isopropanol per part $P_2O_5$ in the acid effectively enhanced the green color of the acid within two minutes after addition of 100° F. while lowering the EMF of the acid from 780 mv to 521 mv relative to the black unoxidized acid.

It was unexpected that selected organic compounds, and especially isopropanol, would act as reducing agents and react with the purple-colored oxidized, metallic complexes present in the acid at low temperatures between 75° and 150° F. to lower the EMF and enhance the green color of the acid. The organic end products of the color-enhancement reaction using compounds such as isopropanol at the specified temperature range may not be completely oxidized to $CO_2$ and water as would be expected from a decarbonization reaction or a color-enhancement reaction brought about by aging the oxidized acid at an elevated temperature above 300° F. Thus some residual organic compounds may remain in the acid when using an organic reducing agent at the lower temperature range. These residual organic compounds will not darken or discolor the acid during subsequent processing as long as the total amount of carbonaceous material in the acid is less than about 1000 ppm, or an amount of carbonaceous material is less than about 0.0015 lb. carbon/lb. $P_2O_5$ in the acid, and the EMF of the green, color-enhanced acid is less than 700 mv. The total amount of carbonaceous material includes the residual organic material remaining in the acid after the primary stage of the process and the residual organic compounds remaining in the acid after the secondary stage of the process.

As previously mentioned, addition of a suitable organic reducing agent continues until the acid attains the same desirable green color, EMF, and maximum transmittance achieved by the previously described aging operation, provided the concentration of organic material in the acid does not exceed about 1000 ppm or an amount of carbonaceous material less than about 0.0015 lb. carbon/lb. $P_2O_5$ in the acid.

Returning again to the flow sheet depicted in FIG. 1a, the purple-colored, highly oxidized acid exiting the primary reactor may be cooled below the boiling point of the selected organic reducing agent by the use of the product cooler 34 before reacting with the reducing agent in the secondary stage of the process. Alternatively, the oxidized acid may bypass the secondary reactor 38 and flow directly to storage, where the acid may cool to a desired temperature prior to the addition of the organic reducing agent. Thus, color enhancement of the acid using an organic reducing agent may be accomplished during storage.

More typically, decarbonized, color-enhanced, and stabilized green wet-process acid or SPA is transferred from the secondary reactor or CSTR through line 44. SPA is transferred through line 44 to a product cooler 46 where the temperature is lowered to around 200° F. prior to storage or conversion into ammonium polyphosphate liquid fertilizer. Fifty-eight percent of 66% wet-process acid treated by the process is transferred through line 9 directly to superphosphoric acid evaporator (not shown).

Figure 1B:
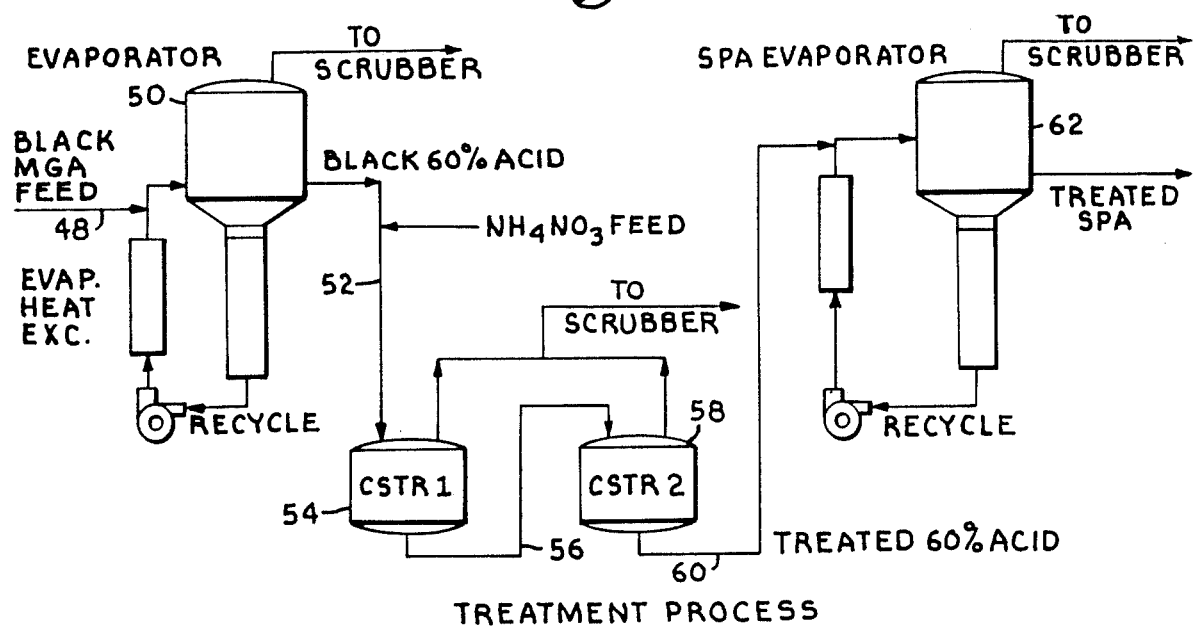

The flow sheet depicted in FIG. 1b illustrates the overall process for the production of decarbonized, green, color-enhanced, and stabilized SPA from 42% to 54% $P_2O_5$ low-magnesium WPA. WPA is transferred from a centrifugation and aging operation designed to remove magnesium from the acid through line 48 to a steam-heated phosphoric acid evaporator 50. The WPA is concentrated and heated to around 350° F. and from 42% to around 58% to 66% $P_2O_5$ in the evaporator 50. The 58% to 66% $P_2O_5$ WPA is then transferred through line 52 to the primary reactor 54 (batch or CSTR) of the treatment process, where the temperature is maintained above 400° F. and preferably between 425° and 450° F. using a gas-fired heater (not shown). The decarbonization, color-enhancement, and stabilization treatment process continues as described earlier and as shown in FIG. 1a; i.e., the initially oxidized acid from reactor 54 is fed in line 56 to a secondary heated reactor 58 to produce stabilized acid. The finally treated acid then flows through line 60 to the gas-fired superphosphoric acid evaporator 62 and is concentrated up to around 68% $P_2O_5$ SPA.

The process flow sheets shown in FIGS. 1a and 1b and the foregoing description of the invention are intended to depict either continuous or batch-mode operations. It should be understood that the primary and secondary stages of the batch-mode treatment process could be carried out in either a single tank or in two tanks, or in both tanks sequentially, or in a series.

Typically process parameters and ranges for both the continuous and batch-mode operations of the processes are set forth in Table I:

Example 5 describes the use of the treatment process using laboratory-scale, continuous-process equipment. Example 6 describes the use of plant-scale, continuous-process equipment depicted in FIG. 1a to successfully treat black SPA and produce partially decarbonized, color-enhanced, and stabilized SPA and 10-34-0 ammonium phosphate liquid fertilizer.

EXAMPLE 1

Figure 1C:
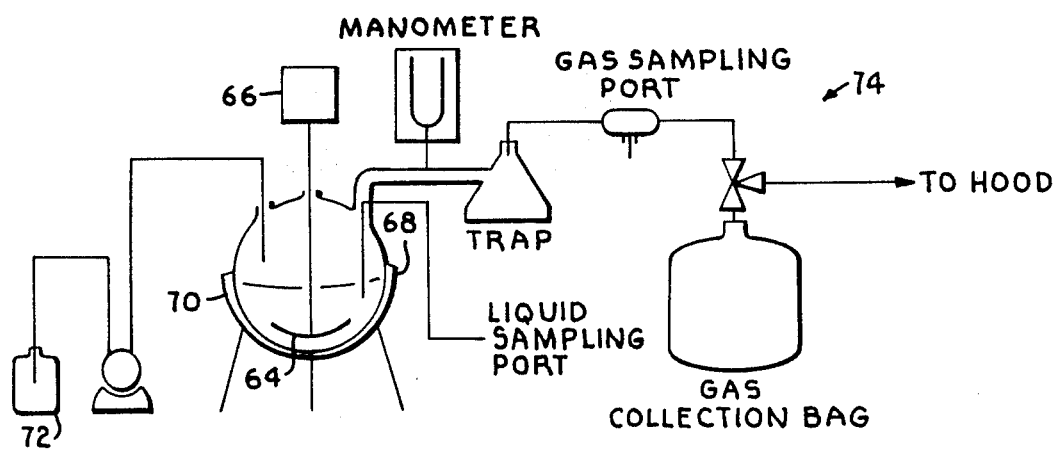
Figure 2:
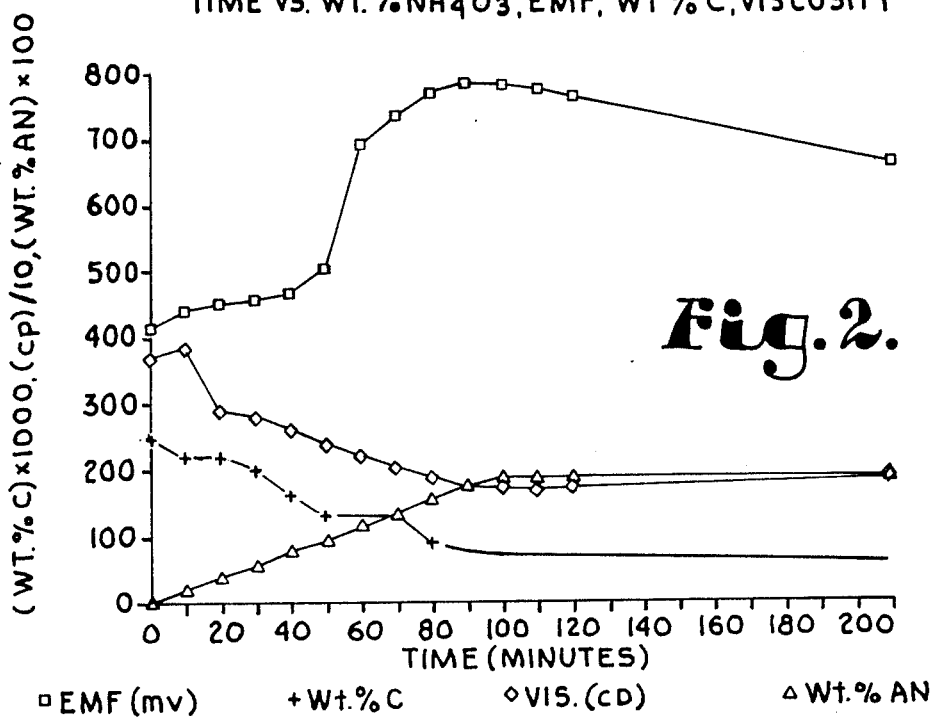

A schematic diagram of the laboratory equipment used in the batch-mode operation of the treatment process for Examples 1, 2, 3, and 4 is shown in FIG. 1c. The equipment basically consists of a reaction flask 64 equipped with stirring motor 66 and heating mantle 68, a pump 70 for delivery of AN from reservoir 72, and an apparatus 74 for sampling and collecting the gases and liquids evolved during the process.

Black-colored and opaque SPA having the following analysis was color-enhanced and stabilized using AN during a batch-mode operation:

TABLE 1

| Typical Process Parameters and Ranges | Primary Stage of Process | Secondary Stage of Process | |
|---|---|---|---|
| Concentration of Acid (% $P_2O_5$) | 58 to 72 | 58 to 72 | |
| Temperature (°F.) | >400 to 525 | Aging or Using Inorganic Reducing Agent | 300 to 525 |
| | | Using Organic Reducing Agent | 75 to 150 |
| Pressure (psia) | 14.7 | | 14.7 |
| Amount of Oxidant | 5 to 10 T AN/ton carbonaceous impurity | | — |
| Amount of Reducing Agent | — | Inorganic Reducing Agent | <0.0009 Lb/Lb $P_2O_5$ |
| | | Unoxidized Black SPA | <.044 Lb/Lb $P_2O_5$ |
| | | Organic Reducing Agent | <0.0009 Lb/$P_2O_5$ or <0.0015 Lb Total Organics/Lb $P_2O_5$ |
| NO—$NO_2$ Concentration in Overhead (Weight %) | <1.0% | Nil | |
| Mixing Conditions | Vigorous | Vigorous | |
| EMF (mv-Relative to Standard or to Black Unoxidized Acid Having an EMF of 400 mv) | >700 | 700 to 600 | |
| Batch Reaction Time | 15 to 120 Min. | Aging | 60 Min. to Several Days |
| | | Using Inorganic Reducing Agent | 2–10 Min. |
| | | Using Organic Reducing Agent | 2 Min. to Several Days |
| Continuous Residence Time | 15 to 90 Min. | Varies With Reducing Agent | |
| Color of Acid Exiting Stage | Purple | Green | |
| Transmittance (Wavelength, nm) | <60% Transmittance at 510 nm | At Least 85% Transmittance at 510 nm | |
| Carbon Concentration of Acid Exiting Stage | <0.0015 Lb/Lb $P_2O_5$ or 100 ppm | <0.0015 Lb/Lb $P_2O_5$ or 1000 ppm | |

The following non-limiting examples are intended to illustrate the use and benefits of the treatment process when used to produce color-enhanced and stabilized 58%–66% $P_2O_5$ WPA, 66%–72% $P_2O_5$ SPA, and 10-34-0 amonium polyphosphate liquid fertilizer. Examples 1, 2, 3, and 4 describe the use of the treatment process using laboratory-scale, batch-mode equipment.

TABLE 2

| Component | Weight Percent |
|---|---|
| $P_2O_5$ | 68.0 |
| Polyphosphate | 28 |
| Carbon | 0.25 |
| Fluoride | 0.30 |

TABLE 2-continued

| Component | Weight Percent |
|---|---|
| Al | 1.61 |
| Fe | 1.86 |
| Mg | 0.31 |
| Mn | 0.04 |
| V | <0.04 |
| EMF | 405 mv |

Black SPA was initally added to the airtight round-bottom flask 64 and heated to above 400° F. The heated space above the reactor and the gas sampling and collection apparatus were then evacuated and purged with helium. Helium was continuously flushed through the reactor at approximately 300 ml/min. to remove the by-product gases from the reactor and provide for instantaneous sampling of the by-product gases produced during the reaction throughout the treatment process. A 60% solution of ammonium nitrate was pumped at a constant flow rate of 0.0188 weight percent/minute into the vigorously stirred reaction mixture, and the temperature of the mixture was maintained between 410° and 450° F. AN was added to the reactor over a 100-minute interval, and gas and liquid samples were taken from the reactor every ten minutes. The reaction mixture was then allowed to age for an additional 110 minutes without AN addition to enhance the green color of the acid.

The data for Example 1 is shown in FIGS. 2, 3, and 4a–n. The results depicted in FIG. 2 clearly illustrate three main trends that characteristically describe the treatment process:

1. The carbon concentration and viscosity initially decreased in proportion to the amount of AN added to the reaction mixture.

2. The EMF of the mixture initially rose slowly in proportion to the amount of AN until the carbon concentration was lowered to around 1300 ppm, and then the EMF rose very rapidly to reach a maximum value at 90 minutes before cessation of the addition of AN at 100 minutes.

3. The carbon concentration continued to decrease after the cessation of the addition of AN, and the decrease paralleled the fall in the EMF of the mixture over the time period devoted to the aging operation.

Figure 4A:
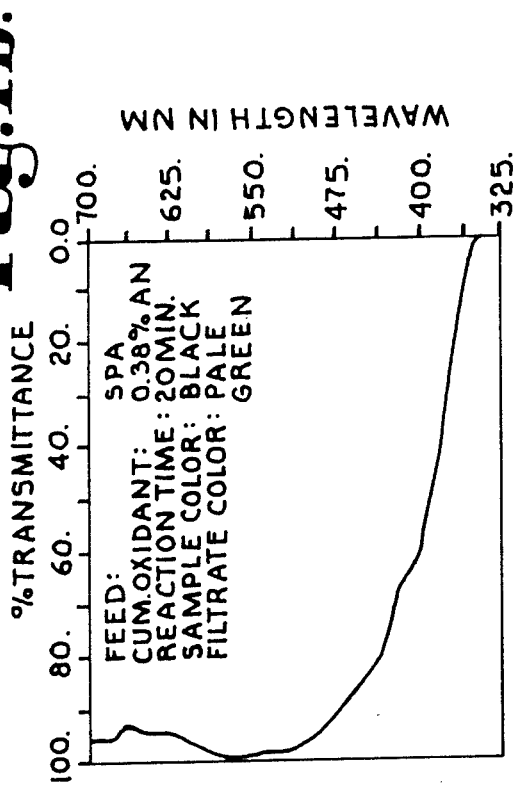
FIGS. 4a–4m are respective graphs depicting the change in the visible color spectrum occurring in the acid during the course of the batch-mode process of FIG. 2.
Figure 4B:
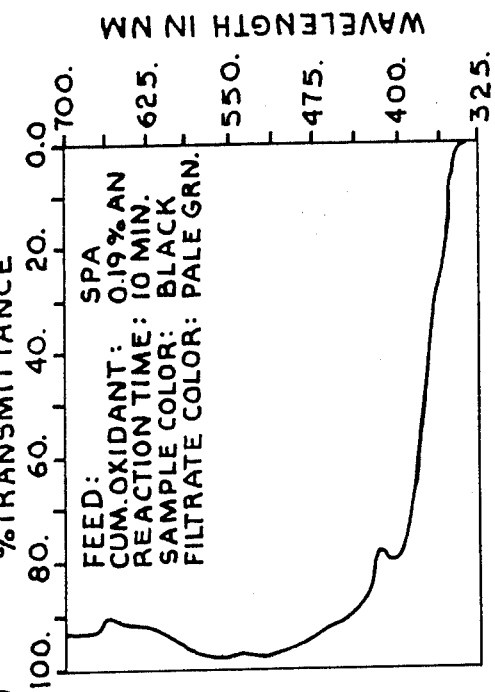
Figure 4C:
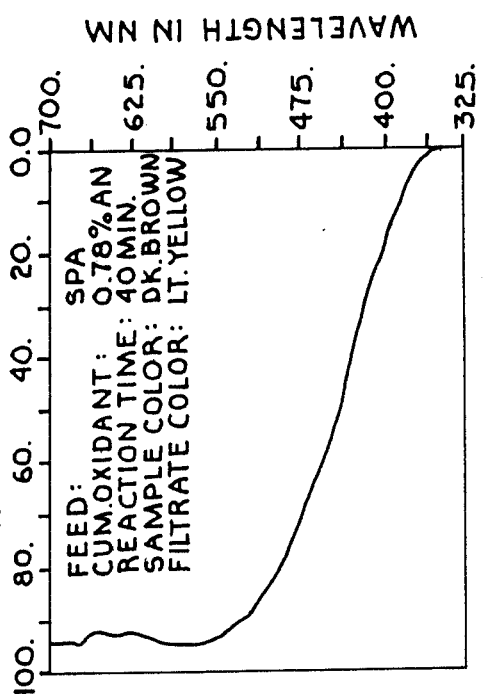
Figure 4D:
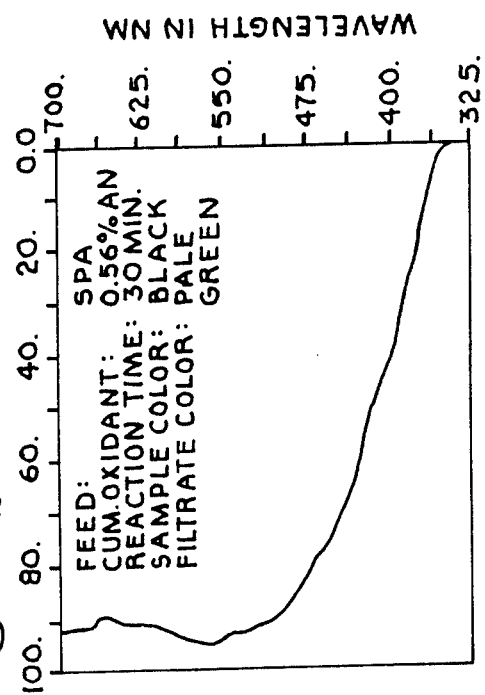
Figure 4F:
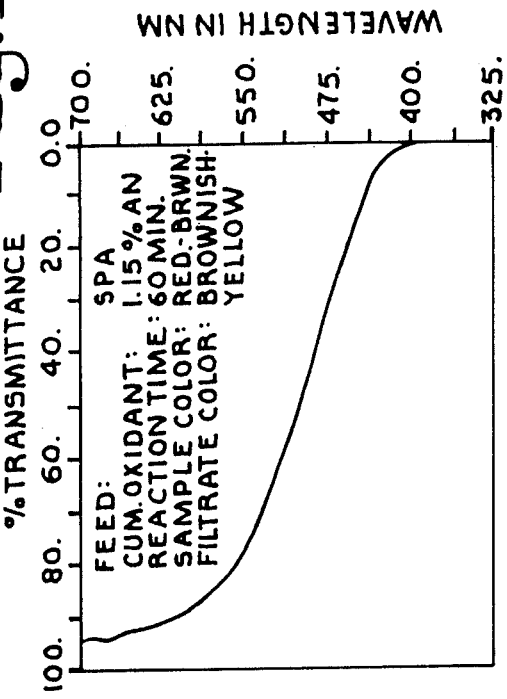
Figure 4E:
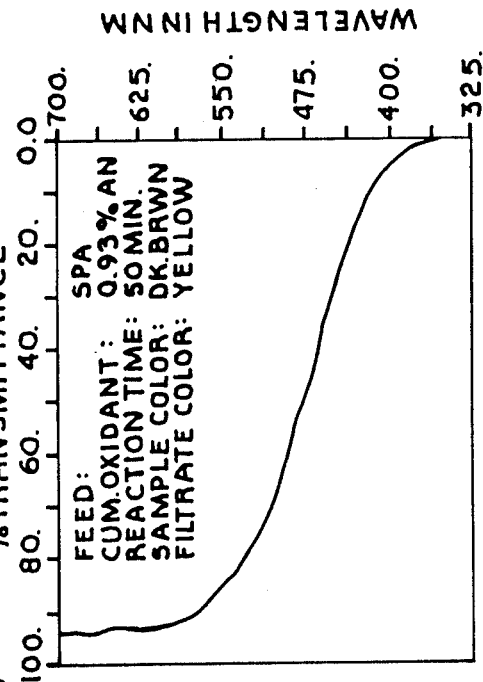
Figure 4H:
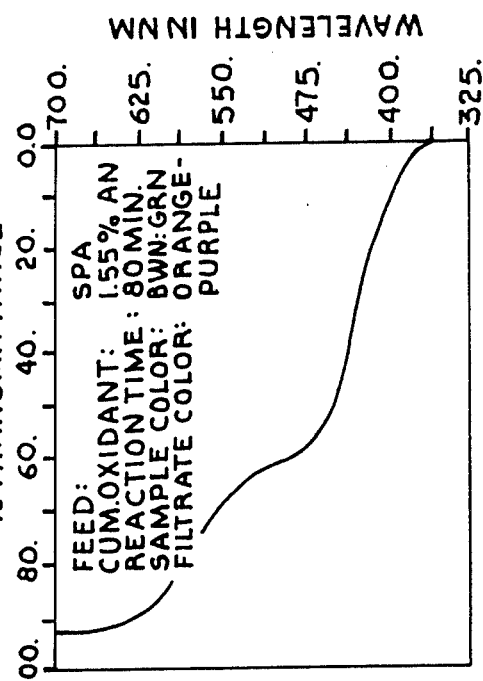
Figure 4G:
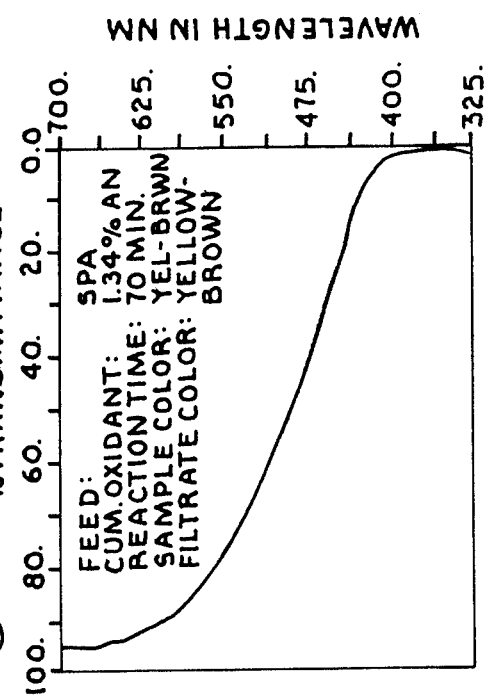
Figure 4I:
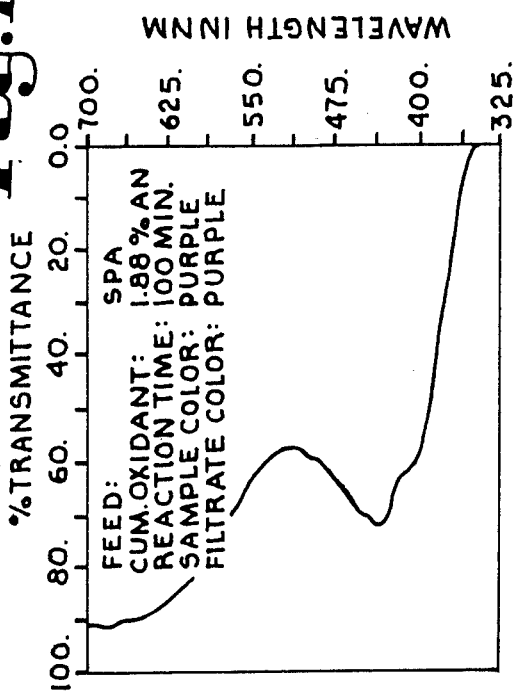
Figure 4K:
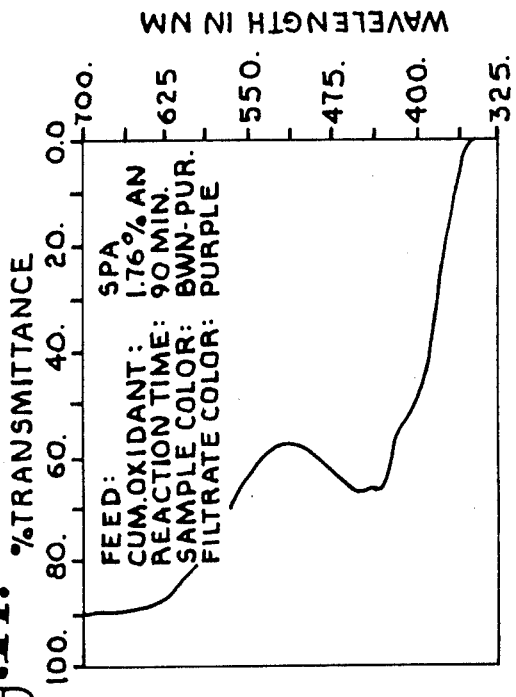
Figure 4J:
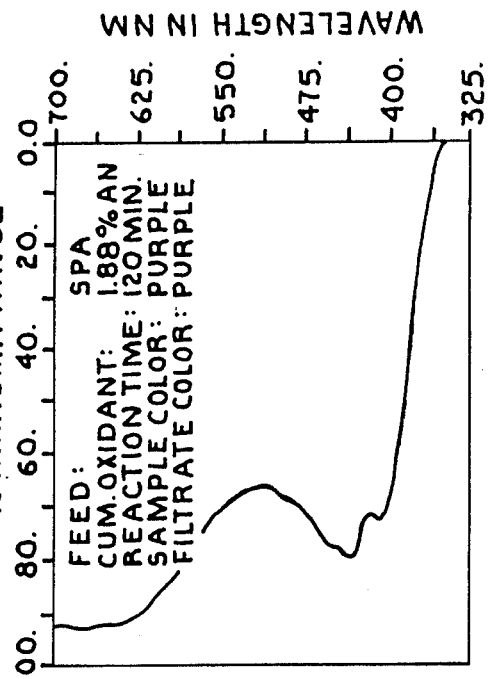
Figure 4L:
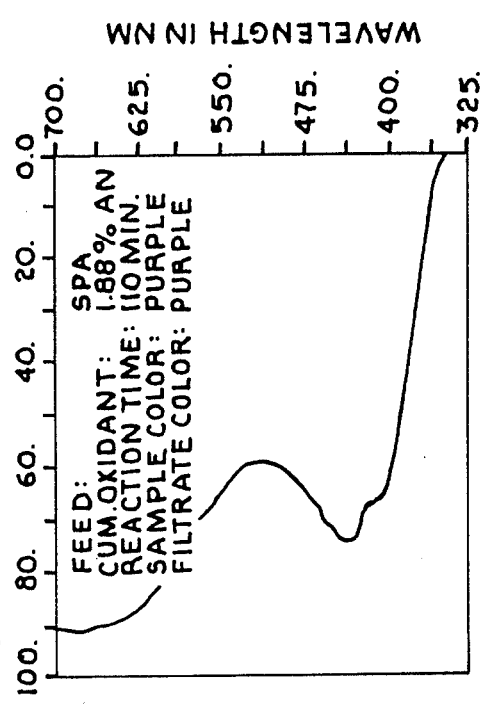
Figure 4M:
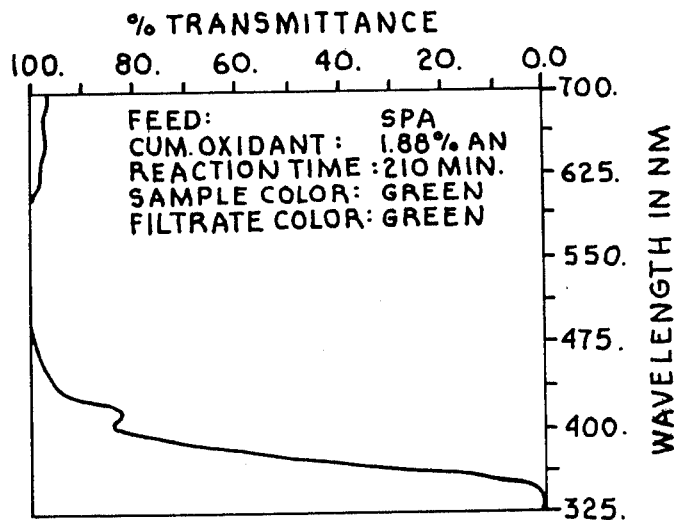

Anaylsis of the data set forth in FIGS. 4a–4n illustrates the enhancement of color that occurred during the process. The scans shown in FIG. 4 were prepared by first diluting 3 g of liquid sample taken every ten minutes with 10 ml of water and then filtering the samples through a 0.45-micron filter. The concentration of $P_2O_5$ in the diluted sample was about 18%. The filter removed any residual particulate carbonaceous material or carbon floc remaining in the sample, and the amount of carbonaceous material adhering to the filter was an indication of the progress of the decarbonization of the acid. Therefore, samples taken during the first 45 minutes of the process contained enough carbon to blacken the sample, even though the filtrate was clear and exhibited a characteristic color ranging from pale green at the beginning of the process to yellow after 45 minutes of the process. The data indicated that maximum transmittance at 510 nm represented the point of maximum color enhancement of the desirable green color typically found in acid manufactured from calcined rock. This color was most evident at the beginning of the treatment process, provided that the carbonaceous material was removed by dilution and filtration. The scans clearly indicated the disappearance of the green color as mirrored by the reduction in transmittance at 510 nm exhibited by the samples during the progression of the primary oxidation stage of the process. Continued oxidation resulted in a reduction in the carbon and fluoride concentration and an increase in the EMF of the acid which paralleled a decrease in the transmittance at 510 nm shown by the acid. FIG. 5 depicts the relationship between maximum EMF, maximum amount of added AN, and the maximum development of the purple color and total absence of the desirable green color as demonstrated by the acid showing less that 60% transmittance at 510 nm. Cessation of the treatment process at this stage would result in an unstable, purple-colored decarbonized acid.

Aging the acid to permit the reduction of the purple-colored metallic complex and oxidation of residual carbon in the secondary stage of the process resulted in the enhancement in the green color of the acid. The percent transmittance at 510 nm rose to around 100% during the aging process, and the color was green while the EMF fell from around 780 mv to around 650 mv relative to the standard. The final product was a green-colored SPA having a viscosity less than 2000 cps and a carbon concentration around 650 ppm. No residual nitrate or ammonia was present in the acid, and the acid was stabilized at an EMF around 650 mv. An analysis of the finished acid is shown in the following Table 3:

TABLE 3

| Component | Weight Percent |
|---|---|
| $P_2O_5$ | 68.3 |
| Polyphosphate | 17.0 |
| Carbon | .07 |
| Fluoride | 0.22 |
| Fe | 1.87 |
| Al | 1.62 |
| Mg | 0.31 |
| Mn | 0.04 |
| V | <0.04 |
| EMF | 650 mv |
| Color | Green |
| % Transmittance at 510 nm | 100% |
| Residual AN or Nitrates | None |

Figure 3:
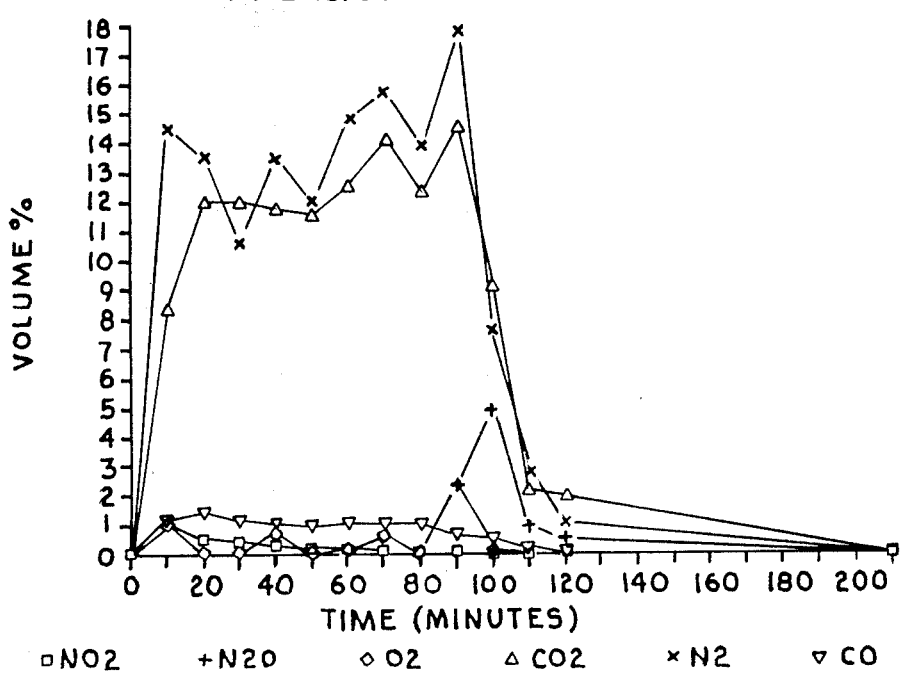
FIG. 3 is a graphical representation showing the composition of the by-product gases evolved over time during the batch-mode process of FIG. 2.

Evaluation of the data depicted in FIG. 3 shows that $N_2$ and $CO_2$ were initially the most abundant species in the by-product or off-gas and remain so throughout the process. $NO_2$, CO, and $O_2$ were also present in the by-product gas at the beginning of the process. The CO concentration remained fairly constant at around 1% throughout the process, while $O_2$ fluctuated widely. It is important to note that $NO_2$ was only present in a significant amount at around 1% at the beginning of the process, while declining to zero towards the middle of the process. NO was not detected in this example. The concentration of $N_2O$, however, rapidly rose from 0% at 80 minutes to a peak of 5% at 100 minutes, at which time the AN ceased to be added to the reactor. The rapid rise in $N_2O$ occurred during the time in which the concentrations of $N_2$ and $CO_2$ were falling. The data indicate that the addition of AN between 90 and 100 minutes resulted in rapid decomposition of AN into $N_2O$ and $H_2O$ rather than decarbonization of residual carbon. The leveling off of the decline in the amount of $CO_2$ in the by-product gas at 120 minutes in the absence of AN suggests that the residual oxidized metallic complex was continuing to remove carbon from the reaction mixture during the secondary stage of the treatment process. Although the data represented in FIG. 3 came from samples diluted with a constant stream of helium, the $NO_2$ concentration obtained from a composite sample representing the gas produced over the entire process time was less than 1.0%. The analysis of a typical composite gas sample is shown in the following table:

TABLE 4

| Component | Weight Percent |
| --- | --- |
| $N_2$ | 53.20 |
| $CO_2$ | 36.25 |
| CO | 5.6 |
| NO | .5 |
| $NO_2$ | .4 |
| $N_2O$ | 2.3 |
| $H_2O$ and other components | 1.8 |

The composite gas analysis establishes that less than 1.0% NO and $NO_2$ were produced during the treatment process with the use of AN and at the rate of addition of AN shown in the example. Similar examples of the use of the treatment process in which the AN was added at significantly higher rates during the primary stage, at greater than 1.88 weight percent AN in less than ten minutes, have resulted in the production of between two and four times the amount of $NO_2$ in the by-product gas compared to this example.

The data of FIG. 3 correlate well with the data of FIGS. 4 and 5 and support the value of the two-stage process for the decarbonization, color enhancement, and stabilization of SPA. Operation of a continuous treatment process at an EMF above 700 mv with a heel of acid containing purple-colored in situ oxidant should decarbonize SPA with the formation of a minimum amount of NO and $NO_2$.

EXAMPLE 2

Merchant-grade WPA normally used to produce the black-colored SPA was first concentrated by evaporative heating to around 64% $P_2O_5$ WPA, and was then reacted with 1.86% AN (as a % of the SPA weight) at a temperature between 410° and 450° F. using the same laboratory equipment and procedure as described in Example 1. An analysis of starting unoxidized black merchant-grade phosphoric acid is shown in the following table:

TABLE 5

| Component | Weight Percent |
| --- | --- |
| $P_2O_5$ | 56.1 |
| Polyphosphate | 0 |
| Carbon | 0.25 |
| Fluoride | 0.16 |
| Fe | 0.71 |
| Al | 0.71 |
| Mg | 0.27 |
| Mn | 0.023 |
| V | <0.04 |
| EMF | 480 |
| Color | Black |

The time of addition of the AN was around 70 minutes. The EMF of the unoxidized starting material was 480 mv compared to around 400 mv for the unoxidized black SPA described in Example 1. The lower EMF of the SPA is the result of a longer exposure time to the reducing process conditions typically found during evaporation and especially during evaporation of WPA to 66%–72% SPA using the superphosphoric acid evaporator.

As was the case in Example 1, samples of the reaction mixture and of the evolved gases were taken every ten minutes and analyzed for relevant process parameters. Data from Example 2 is set forth in FIGS. 6, 7 and 8a–k, and 9.

The same process trends exhibited during the treatment process of SPA were found in this example using 64% WPA. The carbon concentration in the acid declined initially in proportion to an increase in the amount of AN added to the reaction mixture and continued to decline for a significant period of time after cessation of the addition of AN at 70 minutes' reaction time. The fluoride concentration in the acid was reduced approximately 15%–30% during the process. The EMF of the reaction mixture increased gradually at first and then increased rapidly to a maximum value around 800 mv. As shown in FIGS. 8a–k and 9, the reaction mixture changed color in relationship to the changing EMF of the mixture and acquired a dark purple color resulting from the highly oxidized metallic complexes at an EMF above 700 mv. As was the case for Example 1, the EMF began to decline in proportion to a decline in the carbon concentration in the acid after the cessation of addition of AN. Approximately 70 minutes' aging time was required during the secondary stage of the treatment process to allow for the enhancement of the green color in the acid and for the in situ oxidation of residual carbon with the highly oxidized metallic complexes. The partially decarbonized and green color-enhanced WPA exhibited 85% transmittance at 510 nm and was stabilized by the secondary stage of the treatment process at an EMF of around 680 mv. The analysis of the color-enhanced and stabilized WPA is shown in the following table:

TABLE 6

| Component | Weight Percent |
| --- | --- |
| $P_2O_5$ | 66.1 |
| Polyphosphate | 8.0 |
| Carbon | 0.045 |
| Fluoride | 0.13 |
| Fe | 0.84 |
| Al | 0.84 |
| Mg | 0.32 |
| Mn | 0.027 |
| V | <0.04 |
| EMF | 680 |
| Color | Green |
| % Transmittance at 510 nm | 88.5% |
| Residual AN or Nitrates | None |

The results indicated that the concentration of the acid increased to around 66% during the treatment process. The increase in concentration of the acid during the process is an additional benefit of the process in that less time and energy need be spent to further concentrate the acid in the SPA evaporator.

Figure 7:
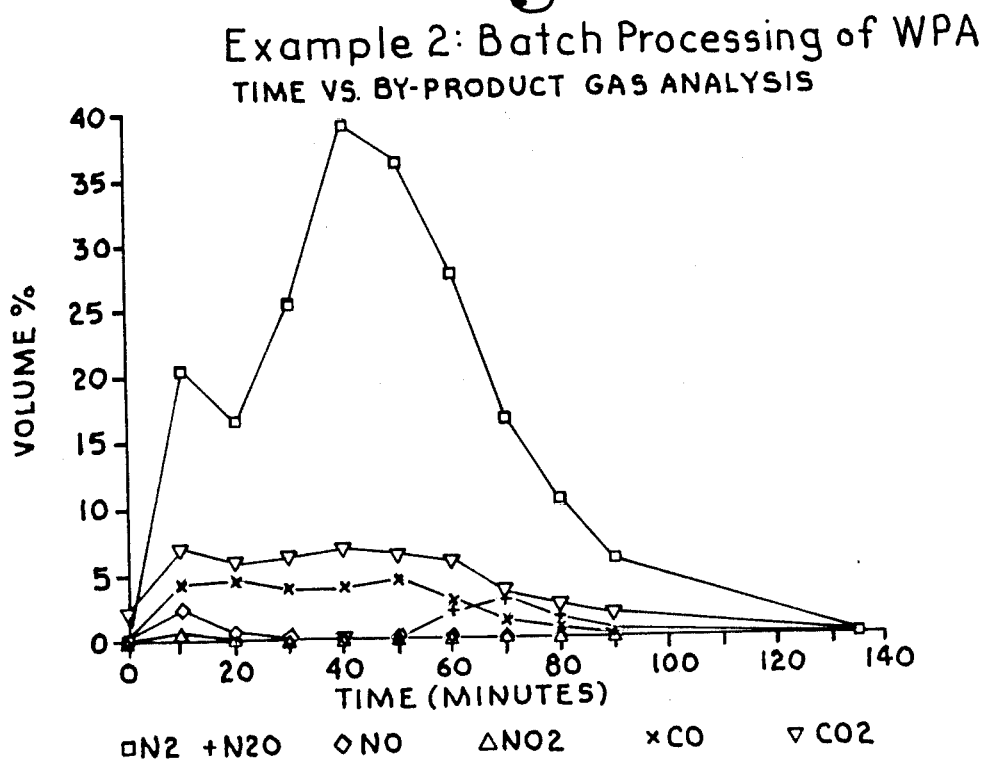
FIG. 7 is a graph depicting the composition of the by-product gases evolved over the time of the batch-mode process of FIG. 6.
Figure 8A:
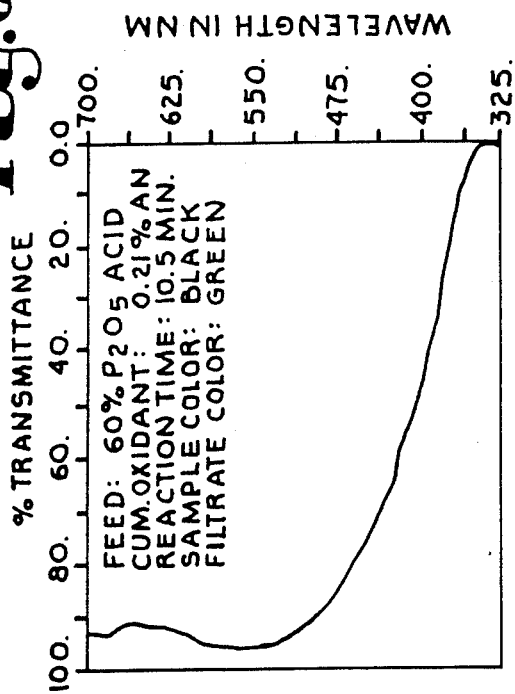
FIGS. 8a–8k are respective graphs illustrating the change in the visible color spectrum of the acid occurring during the batch-mode process of FIG. 6.
Figure 8B:
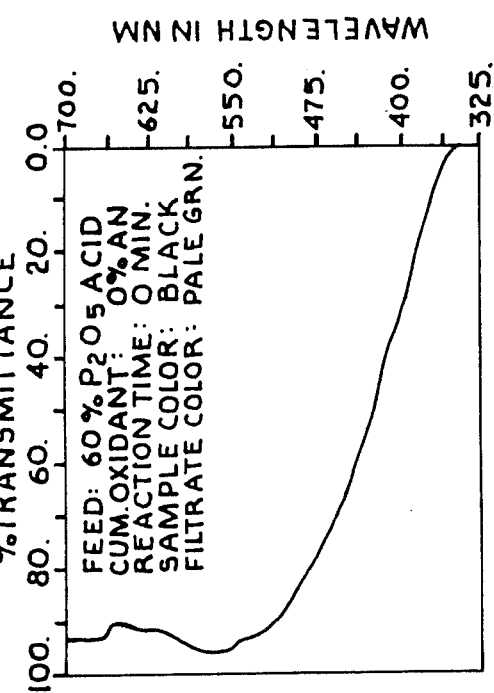
Figure 8C:
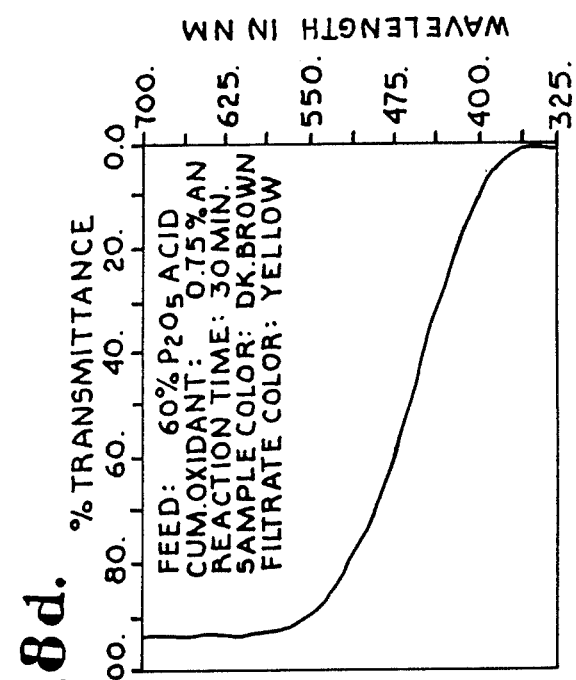
Figure 8D:
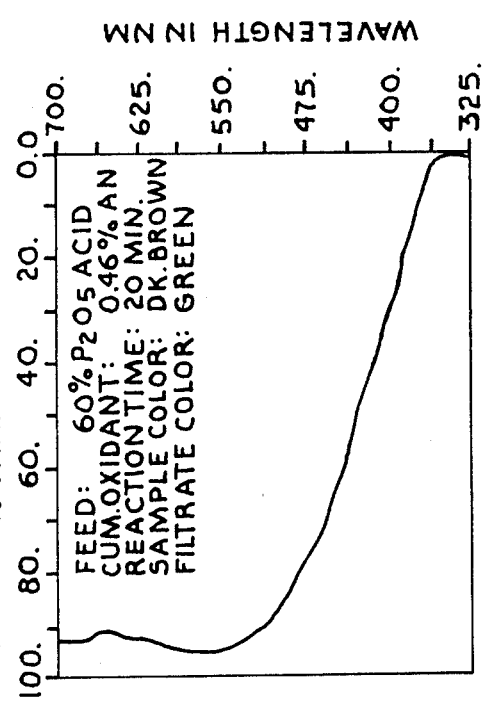
Figure 8F:
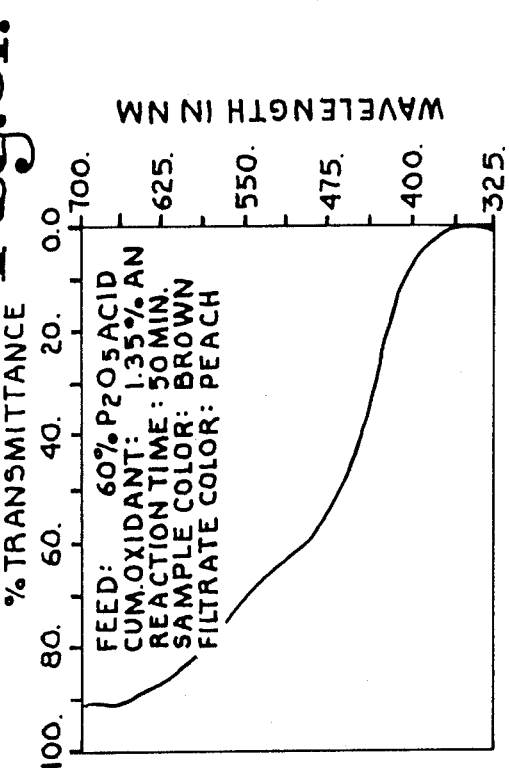
Figure 8H:
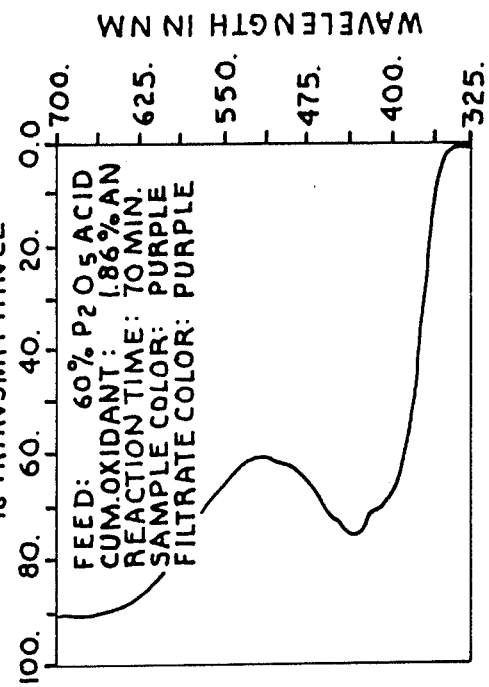
Figure 8E:
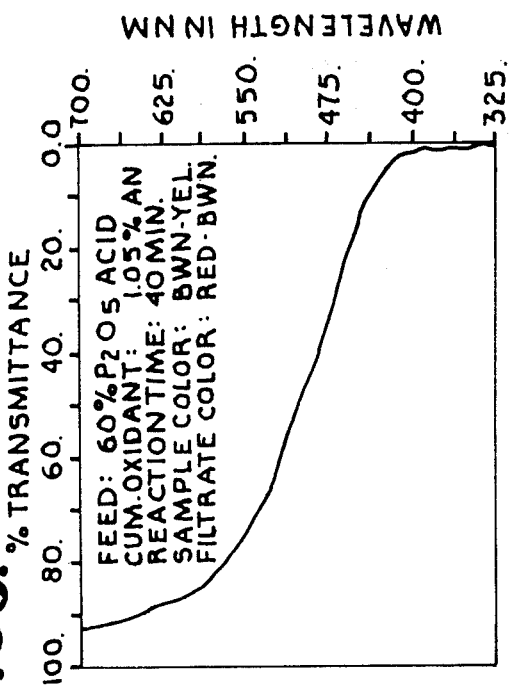
Figure 8G:
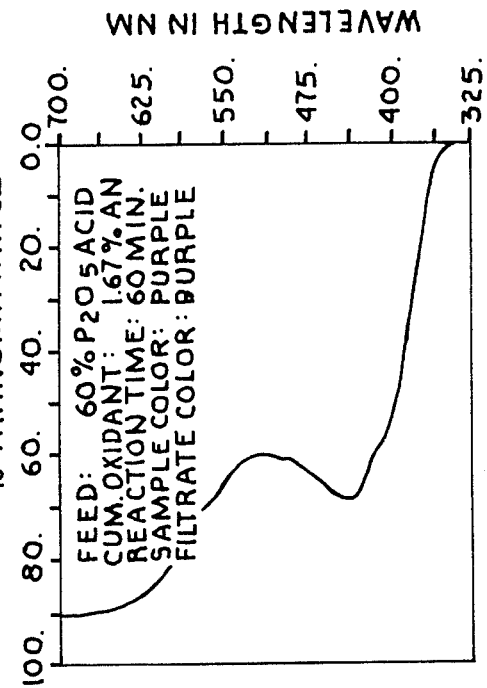
Figure 8J:
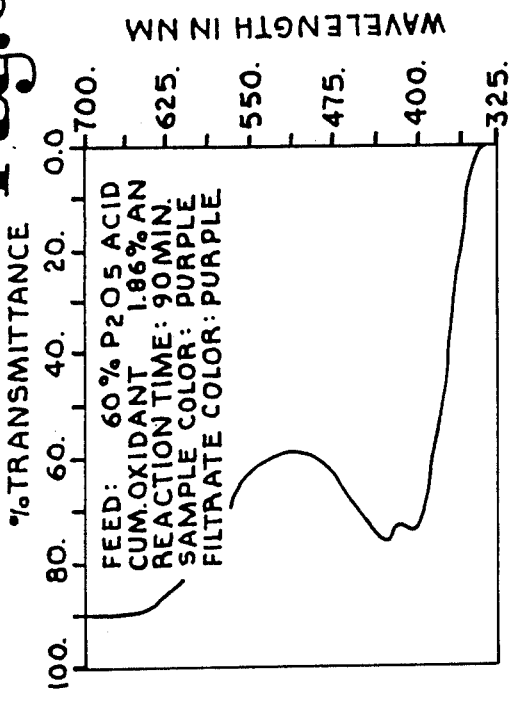
Figure 8I:
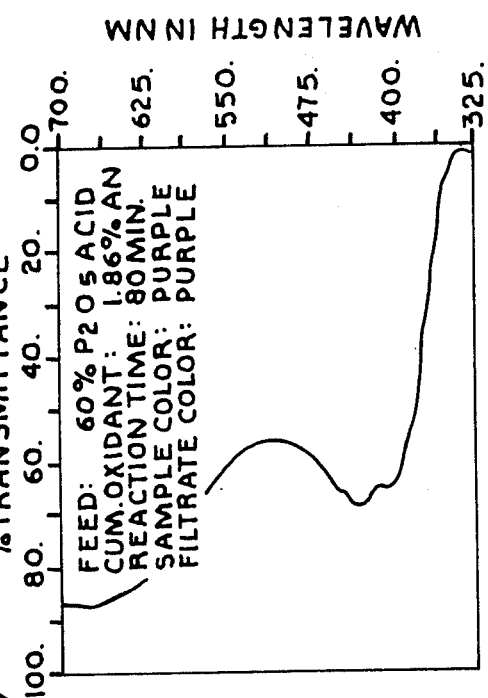
Figure 8K:
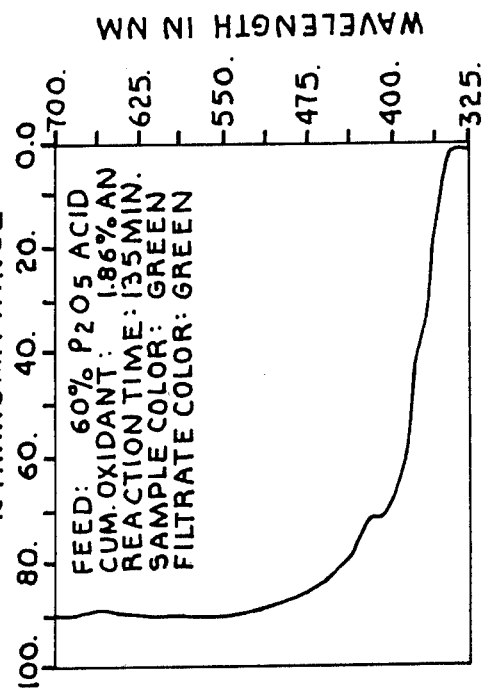
Figure 9:
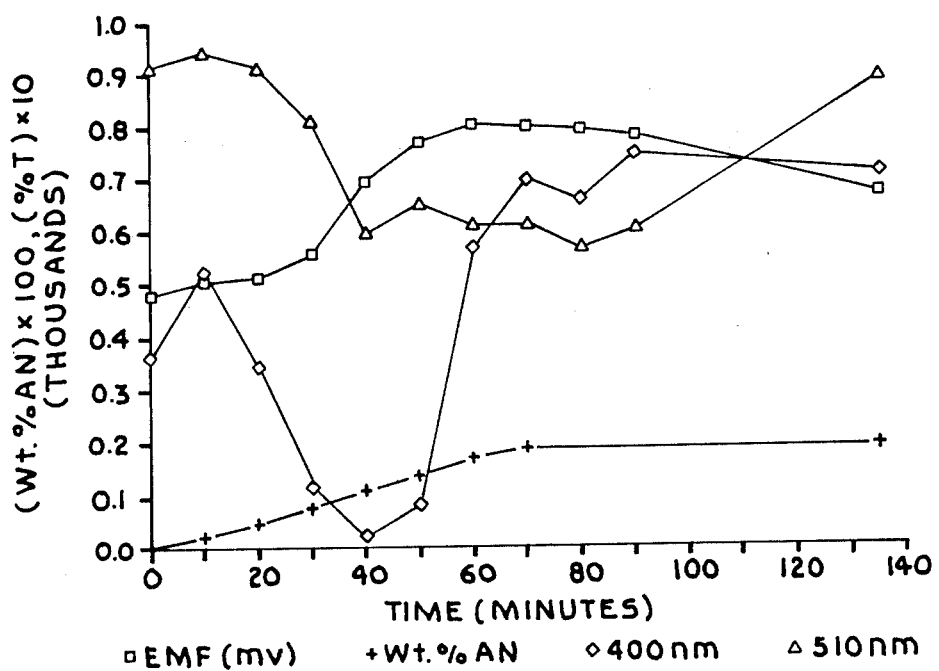
FIG. 9 is a graph depicting the change in the green color spectrum of the acid occurring during the batch-mode process of FIG. 6.

Evaluation of the by-product gases produced during the treatment process, as shown in FIG. 7, indicates that $N_2$, $CO_2$, and CO were present in the highest concentration and were generated more or less continuously during the treatment process. NO, $NO_2$, and $N_2O$, however, were only sporadically produced in low concentrations during the process; NO and $NO_2$ were only generated during the first 20 minutes of the process at an EMF of around 500 mv, while $N_2O$ was only generated after the EMF of the reaction mixture rose above 700 mv. Composite gas samples taken from a replication of the process shown in this example using similar equipment and process conditions were similar in composition to the gas evolved during Example 1.

The green color-enhanced and stabilized 66.1% $P_2O_5$ WPA produced by the treatment process from black-colored 56.1% $P_2O_5$ WPA could then be concentrated to 68% $P_2O_5$ SPA by evaporative heating. The concentrated SPA produced from the color-enhanced and stabilized WPA will not adversely char or darken in color during concentration and will remain a desirable green color. Analysis of a typical sample of color-enhanced and stabilized SPA made from treated WPA is shown below:

TABLE 7

| Component | Weight Percent |
|---|---|
| $P_2O_5$ | 68.0 |
| Polyphosphate | 24.0 |
| Carbon | 0.05 |
| Fluoride | 0.1 |
| Fe | 0.86 |
| Al | 0.86 |
| Mg | 0.33 |
| Mn | 0.028 |
| V | <0.04 |
| EMF | 680 |
| Color | Green |
| % Transmittance at 510 nm | +90% |
| Residual AN or Nitrates | None |

EXAMPLE 3

Approximately 43% $P_2O_5$ WPA was concentrated under vacuum by evaporative heating to around 61% $P_2O_5$ WPA and reacted with 2.1% AN (as a % of the WPA weight) at a temperature between 410° and 450° F. using the same laboratory equipment and procedure as described in Example 1. An analysis of the unoxidized black merchant-grade phosphoric acid is shown in the following table:

TABLE 8

| Component | Weight Percent |
|---|---|
| $P_2O_5$ | 61.5 |
| Polyphosphate | 4.0 |
| Carbon | 0.26 |
| Fluoride | 0.54 |
| Fe | 1.56 |
| Al | 0.88 |
| Mg | 0.14 |
| Mn | 0.027 |
| V | 0.02 |
| Color | Black |
| EMF | 463 mv |

The rate of addition of AN was around 0.0350 weight percent/minute. The EMF of the unoxidized material was approximately the same as the 54% $P_2O_5$ acid used in Example 2.

As was the case for Example 2, the carbon concentration in the acid declined both in proportion to the amount of AN added in the primary stage of the process and to the amount of aging time allowed during the secondary stage of the process. Black acid containing ferrous iron was added in the secondary stage of the process to reduce the residence time necessary for color enhancement. Fluoride concentration in the acid was reduced around 70% during the treatment process. The partially decarbonized and green color-enhanced WPA exhibited +85% transmittance at 510 nm and was stabilized by the secondary stage of the treatment process at an EMF of around 650 mv. Analysis of the by-product gases produced during the treatment process indicated that the composition of the gas stream was essentially the same as the gas produced during Experiment 1. The quantity of $NO_x$ produced during the process visually appeared very low. The analysis of the color-enhanced and stabilized WPA is shown in the following table:

TABLE 9

| Component | Weight Percent |
|---|---|
| $P_2O_5$ | 63.7 |
| Polyphosphate | 4.4 |
| Carbon | 0.06 |
| Fluoride | 0.16 |
| Fe | 1.62 |
| Al | 0.98 |
| Mg | 0.16 |
| Mn | 0.028 |
| V | 0.02 |
| EMF | 659 mv |
| Color | Green |
| % Transmittance at 510 nm | 89% |
| Residual AN or Nitrates | Nil |

The green color-enhanced and stabilized WPA produced by the treatment process containing around 64% $P_2O_5$ was filtered and concentrated up to and beyond 68% $P_2O_5$ by vacuum-evaporative heating. The filtration rate through an uncoated 10-$\mu$ porosity filter membrane was 2.6 tons acid/day square foot at 15" vacuum. The color-enhanced and stabilized acid filtered much more readily and at a faster rate compared to the black unoxidized acid. The concentrated acid did not char or darken in color during the evaporation process or when heated to above 600° for 10 to 15 minutes. The concentrated acid retained the desirable green color. A sample of the treated WPA was also concentrated up to around 72% $P_2O_5$ by an evaporative concentration process similar to that employed in Example 2. Analysis of the sample of color-enhanced and stabilized SPA made from treated 63% WPA is shown below:

TABLE 10

| Component | Weight Percent |
|---|---|
| $P_2O_5$ | 71.8 |
| Polyphosphate | 64.6 |
| Carbon | 0.065 |
| Fluoride | 0.09 |
| Fe | 1.72 |
| Al | 1.02 |
| Mg | 0.18 |
| Mn | 0.025 |
| V | 0.02 |
| Color | Green |
| % Transmittance at 510 nm | 92% |
| Residual AN or Nitrates | Nil |

EXAMPLE 4

This example was carried out according to the procedure outlined for Example 1 except that $HNO_3$ was used instead of AN as the oxidant in the primary stage of the treatment process. Black acid having the same analysis as the acid used in Example 1 was oxidized with around 3.4 weight percent $HNO_3$ at a temperature greater than 400° F. using the batch-mode process depicted in FIG. 1c.

Several trends that occurred during the process, including a decrease in carbon concentration and viscosity that was paralleled by an increase in EMF from around 380 mv to a maximum of around 740 mv and an increase in the amount of oxidant added to the reaction mixture. The acid changed from a black color to a dark purple color at an EMF about 700 mv, and both the color and the EMF of the acid remained unchanging for at least 70 minutes after cessation of the addition of $HNO_3$. Addition of 400 ppm metallic iron reduced the EMF from around 740 mv to 640 mv and enhanced the green color of the acid.

$HNO_3$ was a satisfactory oxidant for decarbonization and color enhancement of SPA in terms of the color and quality of the treated acid. However, a significantly greater amount of $HNO_3$ was required for the treatment process compared to the amount of $NH_4NO_3$ used in Example 1. Relevant physical and chemical properties of the acid produced during the treatment process using $HNO_3$ are shown in the following table:

TABLE 11

| Component | Weight Percent |
|---|---|
| $P_2O_5$ | 67.9 |
| Polyphosphate | 17.9 |
| Carbon | 0.09 |
| Fluoride | 0.20 |
| Fe | 1.86 |
| Al | 1.61 |
| Mg | 0.31 |
| Mn | 0.04 |
| V | <0.04 |
| EMF | 640 |
| Color | Green |
| Viscosity | 1570 |
| Residual $HNO_3$ | <0.01 |

The by-product gas composition data revealed an increase in the production of NO and $NO_2$ when $HNO_3$ is used in the treatment process compared to AN. Initially $N_2$ and $CO_2$ were present in the highest concentration in the evolved gases, although the concentration of $NO_2$ was quite high at around 10% compared to Example 1. $N_2$ and $CO_2$ remained the major gases produced during the reaction up until the carbon concentration in the acid was lowered to around 1200 ppm after more than 40 minutes' processing time. Between 40 and 50 minutes' processing time, the EMF of the acid rose above 700 mv and the concentration of $N_2$ declined dramatically, while the concentration of both NO and $NO_2$ increased rapidly until $NO_2$ was the predominant species in the by-product gas. $NO_2$ ultimately attained a maximum concentration of around 48% after ten minutes of processing time. Evidently, a significant amount of $HNO_3$ was decomposing to $NO_2$ and $O_2$ at an EMF above 700 mv.

All of the gas produced during the treatment process was collected in the gas sampling bag shown in FIG. 1c. Analysis of the composite gas sample depicting the by-product gas evolved during the treatment process is shown in the following table:

TABLE 12

| Component | Weight Percent |
|---|---|
| $N_2$ | 26.0 |
| $CO_2$ | 30.7 |
| CO | 5.7 |
| NO | 2.8 |
| $NO_2$ | 29.6 |
| $N_2O$ | 1.2 |
| $O_2$ | 2.4 |
| $H_2O$ and Other Components | 1.6 |

An evaluation of data indicated that an excessive amount of NO and $NO_2$ was produced during the treatment process using $HNO_3$. The use of AN during the treatment process as depicted in Example 1 is therefore greatly preferred over $HNO_3$ in order to minimize the production of toxic gases including NO and $NO_2$.

EXAMPLE 5

Sixty-eight percent black SPA and 60% $P_2O_5$ black WPA samples containing carbonaceous and metallic impurities and having a respective analysis similar to the SPA and WPA treated in Examples 1, 2, 3, and 4 were continuously treated using laboratory-scale equipment similar in design to the plant-scale equipment shown in FIGS. 1a and 1b. A schematic flow sheet depicting the laboratory-scale process equipment is shown in FIG. 1d. This apparatus includes a reservoir 76 of SPA, and a supply 78 of 60% AN. Respective lines 80, 82, with pumps, extend from the reservoir 76 and supply 78 and intersect to form a mixing tee 84, the latter having a delivery line 86 leading to heated oxidation CSTR 88 equipped with stirrer 90. Overhead from CSTR 88 passes through line 92 and is sampled at 94, whereas the liquid underflow passes through line 96 to the second heated CSTR 98 having stirrer 100. Lines 102 and 104 are provided for overhead and underflow respectively, with line 104 leading to green acid collector 106.

Black acid from several different sources and grades was successfully decarbonized, color-enhanced, and stabilized using the laboratory equipment shown in FIG. 1d. In all cases, a desirably green-colored and stabilized acid was produced using the treatment process, as long as sufficient residence time was allowed in the primary CSTR. A composite material balance based upon the data obtained from these trials and representing typical component flows through the treatment process, process conditions, and compositions for each stream is shown for 68% $P_2O_5$ SPA in Table 13 and for 60% $P_2O_5$ WPA in Table 14.

TABLE 13

| | MATERIAL BALANCE FOR 68% $P_2O_5$ SPA | | | | | | |
|---|---|---|---|---|---|---|---|
| Stream No. (Lb/Hr) Component | 1 Black SPA | 2 AN Feed | 3 Off-Gas CSTR 1 | 4 Purple SPA | 5 Off-Gas CSTR 2 | 6 Total Off-Gas | 7 Green SPA |
| Black SPA | 1993.97 | — | — | 1993.97 | — | — | 1993.97 |
| F | 6.02 | — | 1.51 | 4.51 | — | 1.51 | 4.51 |
| C | 5.01 | — | — | 1.51 | — | — | 1.51 |
| $NH_4NO_3$ | — | 40.90 | — | — | — | — | — |
| $H_2O$ | — | 27.27 | 45.68 | — | — | 45.68 | — |
| $CO_2$ | — | — | 9.18 | — | — | 9.18 | — |
| CO | — | — | 2.32 | — | — | 2.32 | — |
| $N_2O$ | — | — | 0.42 | — | — | 0.42 | — |
| NO | — | — | 0.02 | — | — | 0.01 | — |
| $NO_2$ | — | — | 0.02 | — | — | 0.02 | — |
| $N_2$ | — | — | 14.03 | — | — | 14.03 | — |
| TOTAL | 2005.00 | 68.17 | 73.18 | 2000.00 | 0.00 | 73.18 | 2000.00 |
| C | 5.01 | — | 3.50 | 1.50 | — | 3.50 | 1.51 |
| N | — | 14.32 | 14.31 | — | — | 14.31 | — |
| O | — | 48.78 | 48.78 | — | — | 48.78 | — |

TABLE 13-continued

MATERIAL BALANCE FOR 68% $P_2O_5$ SPA

| Stream No. (Lb/Hr) Component | 1 Black SPA | 2 AN Feed | 3 Off-Gas CSTR 1 | 4 Purple SPA | 5 Off-Gas CSTR 2 | 6 Total Off-Gas | 7 Green SPA |
|---|---|---|---|---|---|---|---|
| H | — | 5.08 | 5.08 | — | — | 5.08 | — |
| Temperature, °F. | 425 | 75 | | 425 | — | | 425 |
| Pressure, atm | 1 | 1 | 1 | 1 | — | 1 | 1 |
| EMF (Mv) | 350–450 | — | — | 750–780 | — | — | 600–700 |
| Viscosity | 3500 | — | — | 1750 | — | — | 1750 |
| % $P_2O_5$ | 68 | — | — | 68 | — | — | 68 |

TABLE 14

MATERIAL BALANCE FOR 60% $P_2O_5$ WPA

| Stream No. (Lb/Hr) Component | 1 Black SPA | 2 AN Feed | 3 Off-Gas CSTR 1 | 4 Purple SPA | 5 Off-Gas CSTR 2 | 6 Total Off-Gas | 7 Green SPA |
|---|---|---|---|---|---|---|---|
| Black 60% Acid | 1985.23 | — | — | 1985.23 | — | — | 1985.23 |
| F | 18.07 | — | 4.52 | 13.55 | — | 4.52 | 13.55 |
| C | 5.02 | — | — | 1.31 | — | — | 1.3 |
| $NH_4NO_3$ | — | 40.17 | — | — | — | — | — |
| $H_2O$ | — | 26.77 | 44.84 | — | — | 44.84 | — |
| $CO_2$ | — | — | 7.68 | — | — | 7.68 | — |
| CO | — | — | 3.77 | — | — | 3.77 | — |
| $N_2O$ | — | — | 0.71 | — | — | 0.71 | — |
| NO | — | — | 0.02 | — | — | 0.02 | — |
| $NO_2$ | — | — | 0.02 | — | — | 0.02 | — |
| $N_2$ | — | — | 13.59 | — | — | 13.59 | — |
| TOTAL | 2008.23 | 66.94 | 75.15 | 2000.00 | 0.00 | 75.15 | 2000.00 |
| C | 5.02 | — | 3.71 | 1.31 | — | 3.71 | 1.31 |
| N | — | 14.06 | 14.06 | — | — | 14.06 | — |
| O | — | 47.90 | 47.90 | — | — | 47.90 | — |
| H | — | 4.98 | 4.98 | — | — | 4.98 | — |
| Temperature, °F. | 425 | 75 | | 425 | — | | 425 |
| Pressure, atm | 1 | 1 | 1 | 1 | — | 1 | 1 |
| EMF (mv) | 400–500 | — | — | 750–820 | — | — | 600–700 |
| % $P_2O_5$ | 60 | — | — | 60 | — | — | 60 |

As noted earlier, continuous addition of AN over a controlled period of time to a heel of acid having an EMF greater than 750 mv minimized the production of NO and $NO_2$ and maximized the oxidation efficiency during the process. The amount of $NO_2$ and NO generated during the continuous process was less than 0.065 weight percent of the total evolved by-product gases. Considerably less NO and $NO_2$ were generated during the continuous process shown in this example compared to the batch processes shown in Examples 1 and 2. Decreasing the residence time in the primary reactor, however, reduced the oxidation efficiency and resulted in the production of significantly more NO and $NO_2$ compared to this example. Decreasing the residence time also resulted in an increase in the amount of AN required for adequate oxidation of the acid during the primary stage of the treatment process.

EXAMPLE 6

A large-scale demonstration continuous-process plant designed according to the schematic flow sheet shown in FIG. 1a was used to treat 68% $P_2O_5$ SPA taken directly from a commercial superphosphoric acid evaporator. The black SPA contained carbonaceous and metallic impurities and was similar in composition and concentration to the SPA described in Example 1. The temperature of the primary and secondary CSTRs were both maintained above 400° F. and typically around 425° F., although the temperature fluctuated between 410° F. and 450° F. during continuous operation over a typical three-hour shift. Each CSTR had a capacity of approximately 1000 gal., and black unoxidized SPA was added to the primary CSTR at around 4 gal/min along with a 60% solution of AN during the primary stage of the treatment process. Approximately 2 weight percent AN was added along with the black SPA to the reactor. The EMF of the purple-colored final reaction mixture from the primary CSTR was maintained above 700 mv, and the residence time in the reactor was at least 60 minutes. Black unoxidized acid containing ferrous iron was added to the secondary CSTR during the secondary stage of the process to reduce the time necessary to enhance the green color of the acid. Visual inspection of the by-product gases indicated that very low levels of $NO_2$ were generated during the treatment process.

Olive green color-enhanced and stabilized SPA containing less than 900 ppm carbonaceous material (as carbon) and having an EMF of 680 mv was produced during the treatment process. The viscosity of the acid was reduced from 4030 cps to 1192 cps, and the acid contained 66.8% $P_2O_5$ and 11.6% polyphosphate. An analysis of the SPA produced during the treatment process is shown in the following table:

TABLE 15

| Component | Weight Percent |
|---|---|
| $P_2O_5$ | 66.8 |
| Polyphosphate | 11.6 |

TABLE 15-continued

| Component | Weight Percent |
| --- | --- |
| Carbon | 0.09 |
| Fluoride | 0.24 |
| Fe | 1.10 |
| Al | 1.16 |
| Mg | 0.28 |
| Mn | 0.04 |
| V | 0.02 |
| EMF | 680 |
| Color | Olive green |
| % Transmittance at 510 nm | 97% |
| Residual AN or Related Nitrates | Nil |

The olive green color-enhanced and stabilized SPA produced during the treatment process was cooled to below 150° F. and reacted with gaseous ammonia using a conventional pipe reactor to form ammonium polyphosphate 10-34-0 grade liquid fertilizer. The treated SPA did not char or darken during conversion into liquid fertilizer, and the resultant liquid fertilizer was a clear, olive green liquid containing around 65% polyphosphate. An analysis of the 10-34-0 liquid fertilizer is shown in the following table:

TABLE 16

| Component | Weight Percent |
| --- | --- |
| $P_2O_5$ | 35.5 |
| Polyphosphate | 64.7 |
| Nitrogen | 10.0 |
| Fluoride | 0.13 |
| Fe | 0.58 |
| Al | 0.58 |
| Mg | 0.15 |
| Mn | 0.02 |
| V | <0.02 |
| EMF | 287 |
| Color | Olive green |
| % Transmittance at 510 nm | 82% |

A portion of liquid fertilizer was subjected to an accelerated storage test in order to determine stability of the fertilizer or the tendency for water-insoluble solids and sludges to form in the liquid fertilizer during storage. The sample was placed in an oven maintained at 110° F. and compared with a typical conventional 10-34-0 fertilizer prepared from the most commercially acceptable green-colored acid having approximately the same impurity level as the treatment process acid. The results of the comparative stability test are set forth in FIG. 11.

The results of the accelerated stability study demonstrate that 10-34-0 liquid fertilizer prepared from color-enhanced and stabilized acid produced using the treatment process of the present invention was significantly more stable and less likely to form insoluble sludges during the commercial storage time period as compared with similar liquid fertilizer prepared from conventional acid.

We claim:

1. A process for preparing color-enhanced and stabilized wet-process phosphoric acid comprising the steps of:
providing a quantity of black-colored wet-process phosphoric acid which has a $P_2O_5$ concentration of from about 58–72%, and contains incidental carbonaceous and metallic impurities therein;
subjecting said quantity of phosphoric acid to an initial oxidation step in order to produce a decarbonized, oxidized acid, said initial oxidation step including the steps of heating the acid to a temperature of from about 400 to 525° F., agitating the acid, and adding an oxidizing agent to the acid,
said initial oxidation step being carried out until the acid changes color from black and when diluted 1:100 by weight with deionized water exhibits an EMF of greater than about 700 mv, as compared with a standard solution of 0.01M potassium dichromate having an EMF of 600 mv;
thereafter subjecting the initially oxidized acid to a secondary reduction step for reducing the dark-colored oxidized metal complexes in the acid and producing a stabilized green color in the acid,
said secondary reduction step being carried out until the acid again changes color and when diluted 1:100 by weight with deionized water exhibits an EMF of less than about 700 mv, as compared with said standard solution.

2. The process of claim 1, said quantity of acid being provided by starting with wet-process acid having a $P_2O_5$ concentration of less than 58%, and thermally concentrating the acid.

3. The process of claim 1, said quantity of acid having a carbon concentration of from about 0.1 to about 1.5% and a metallic impurity concentration of from about 1 to 5%, on a 68% $P_2O_5$ basis.

4. The process of claim 1, said acid being heated in said initial oxidation step prior to said addition of oxidizing agent thereto.

5. The process of claim 1, said temperature in said initial oxidation step being from about 425° F. to 450° F.

6. The process of claim 1, said oxidizing agent being reacted with said acid in a reactor with a residence time of at least about 15 minutes.

7. The process of claim 1, said oxidizing agent being selected from the group consisting of the halides, salts of halide oxyacids, potassium permanganate, hydrogen peroxide, sodium dichromate, oxygen, nitrous oxide, ozone, the nitrates and nitrites.

8. The process of claim 7, said agent being ammonium nitrate.

9. The process of claim 1, the EMF of said initially oxidized acid being greater than about 750 mv.

10. The process of claim 1, said oxidizing agent being ammonium nitrate and being added to said acid at a level of from about 5 to 10 tons of ammonium nitrate per ton of carbonaceous impurities present in the acid.

11. The process of claim 1, said initially oxidized acid containing less than about 1,000 ppm of carbonaceous impurities.

12. The process of claim 1, said initially oxidized acid exhibiting a dark greenish-brown to purple color.

13. The process of claim 1, said initially oxidized acid exhibiting less than 60% transmittance upon dilution with water to contain 18% $P_2O_5$, to 510 nm.

14. The process of claim 1, said secondary reduction step comprising the steps of continuously agitating the acid at a temperature of from about 300 to 525° F. for at least about 60 minutes in order to age the intially oxidized acid and thereby reduce the metal complexes therein.

15. The process of claim 14, said aging peroid being from about 60 minutes to several days.

16. The process of claim 14, including the step of simultaneously increasing the $P_2O_5$ concentration of the acid to produce superphosphoric acid during said aging procedure.

17. The process of claim 1, said secondary reduction step comprising the steps of adding a reducing agent to said acid while the acid is agitated.

18. The process of claim 17, said reducing agent being selected from the group consisting of elemental metals, metal complexes of reduced iron, copper, nickel, chromium and zinc, primary and secondary alcohols, ethers and aldehydes.

19. The process of claim 18, said reducing agent being ferrous iron.

20. A process for treating black colored wet-process phosphoric acid comprising the steps of:

provifing a quantity of the black wet-process phosphoric acid having a $P_2O_5$ concentration of from about 58–72%, and incidental carbonaceous and metallic impurities therein;

subjecting said quantity of phosphoric acid to an oxidation step in order to produce a decarbonized, oxidized acid, said initial oxidation step including the steps of heating the acid to a temperature of from about 400 to 525° F., agitating the acid, and adding an oxidizing agent to the acid, said oxidation step being carried out until the acid changes color from black and assumes a dark greenish-brown to purple color and the acid when diluted 1:100 by weight with deionized water exhibits an EMF of greater than about 700 mv as compared with a standard solution of 0.01M potassium dichromate having an EMF of 600 mv.

21. The process of claim 20, said oxidizing agent being reacted with said acid in a reactor with a residence time of at least about 15 minutes.

22. The process of claim 20, said oxidizing agent being reacted with said acid in a reactor with a residence time of at least about 15 minutes.

* * * * *